(12) United States Patent
Takatori

(10) Patent No.: US 11,270,661 B2
(45) Date of Patent: Mar. 8, 2022

(54) DISPLAY APPARATUS AND DISPLAY METHOD

(71) Applicant: Panasonic Intellectual Property Management Co., Ltd., Osaka (JP)

(72) Inventor: Masahiro Takatori, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 197 days.

(21) Appl. No.: 16/475,967

(22) PCT Filed: Jul. 5, 2018

(86) PCT No.: PCT/JP2018/025427
§ 371 (c)(1),
(2) Date: Jul. 3, 2019

(87) PCT Pub. No.: WO2019/130626
PCT Pub. Date: Jul. 4, 2019

(65) Prior Publication Data
US 2020/0410957 A1    Dec. 31, 2020

(30) Foreign Application Priority Data
Dec. 27, 2017 (JP) .............................. JP2017-251571

(51) Int. Cl.
*G09G 5/391*    (2006.01)
*G09G 5/10*     (2006.01)
*G09G 3/20*     (2006.01)

(52) U.S. Cl.
CPC ............. *G09G 5/10* (2013.01); *G09G 3/2096* (2013.01); *G09G 5/391* (2013.01);
(Continued)

(58) Field of Classification Search
CPC ........ G09G 5/10; G09G 3/2096; G09G 5/391; G09G 2320/0673; G09G 2340/0407;
(Continued)

(56) References Cited

U.S. PATENT DOCUMENTS

| 5,680,477 A | 10/1997 | Asada |
| 2005/0200760 A1 | 9/2005 | Nakakuki |

(Continued)

FOREIGN PATENT DOCUMENTS

| EP | 3 157 243 A1 | 4/2017 |
| EP | 3 512 188 A1 | 7/2019 |

(Continued)

OTHER PUBLICATIONS

International Search Report (ISR) dated Oct. 9, 2018 in International (PCT) Application No. PCT/JP2018/025427.
(Continued)

*Primary Examiner* — Temesghen Ghebretinsae
*Assistant Examiner* — Karin Kiyabu
(74) *Attorney, Agent, or Firm* — McDermott Will and Emery LLP

(57) ABSTRACT

A display apparatus includes: an obtainer that obtains HDR video data representing a luminance of each pixel by a code value; a converter that converts the HDR video data into HDR video using a first EOTF; a region extractor that extracts a first region including a pixel having a code value included in a first range of less than a first code value corresponding to a first point at which a slope of a tangent to the first EOTF is a predetermined slope and a second region including a pixel having a code value included in a second range of greater than or equal to the first code value; an adjuster that increases a sharpness gain of the first region relative to a sharpness gain of the second region in the HDR (Continued)

video data; and a display that displays the HDR video using adjusted data resulting from the adjustment.

9 Claims, 13 Drawing Sheets

(52) U.S. Cl.
CPC ............ *G09G 2320/0673* (2013.01); *G09G 2340/0407* (2013.01); *G09G 2360/142* (2013.01); *G09G 2360/16* (2013.01)

(58) Field of Classification Search
CPC ......... G09G 2360/142; G09G 2360/16; G09G 2340/0428; G09G 2320/0271; G09G 5/005; G09G 2320/066; G09G 2370/04; G09G 5/02; H04N 5/202
See application file for complete search history.

(56) References Cited

U.S. PATENT DOCUMENTS

| | | | |
|---|---|---|---|
| 2013/0328907 A1 | 12/2013 | Ballestad et al. | |
| 2014/0002479 A1* | 1/2014 | Muijs | G06T 5/50 345/589 |
| 2014/0210847 A1* | 7/2014 | Knibbeler | G06T 11/001 345/589 |
| 2015/0002559 A1* | 1/2015 | Fojine | G09G 3/3426 345/690 |
| 2016/0142714 A1* | 5/2016 | Toma | H04N 21/4621 375/240.25 |
| 2017/0085827 A1* | 3/2017 | Terada | H04N 5/57 |
| 2017/0132766 A1* | 5/2017 | Ono | H04N 5/232123 |
| 2018/0048845 A1* | 2/2018 | Kozu | H04N 11/24 |
| 2019/0172421 A1* | 6/2019 | Eto | G09G 5/006 |
| 2019/0335149 A1* | 10/2019 | Hirota | H04N 21/431 |

FOREIGN PATENT DOCUMENTS

| | | |
|---|---|---|
| JP | H05-91324 A | 4/1993 |
| JP | 2000-115534 A | 4/2000 |
| JP | 2005-260517 A | 9/2005 |
| JP | 2014-512740 A | 5/2014 |
| JP | 2017-220690 A | 12/2017 |
| WO | 2012/125802 A1 | 9/2012 |
| WO | WO-2016063474 A1 * | 4/2016 ........... H04N 21/436 |

OTHER PUBLICATIONS

Extended European Search Report dated Jan. 13, 2021 issued in corresponding European Patent Application Mo. 18889941.3.

* cited by examiner

DISPLAY APPARATUS AND DISPLAY METHOD

CROSS REFERENCE

This application is the U.S. National Phase under 35 U.S.C. § 371 of International Application No. PCT/JP2018/025427, filed on Jul. 5, 2018, which claims the benefit of Japanese Patent Application No. 2017-251571, filed Dec. 27, 2017, the entire contents of each are hereby incorporated by reference.

TECHNICAL FIELD

The present disclosure relates to a display apparatus and a display method for displaying HDR video obtained by converting HDR video data.

BACKGROUND ART

PTL 1 discloses an apparatus that converts image data for display on a target display, according to a transfer function.

CITATION LIST

Patent Literature

PTL 1: Japanese Unexamined Patent Application Publication (Translation of PCT Application) No. 2014-512740

SUMMARY OF THE INVENTION

Technical Problem

The present disclosure provides a display apparatus, etc. that can effectively prevent a decrease in sharpness of HDR video obtained by converting HDR video data.

Solution to Problem

A display apparatus according to the present disclosure includes: an obtainer that obtains high dynamic range (HDR) video data representing a luminance of each pixel by a code value; a converter that converts the HDR video data into HDR video using a first electro-optical transfer function (EOTF); a region extractor that determines, for each pixel of the HDR video data, whether the code value of the pixel is included in a first range of less than a first code value corresponding to a first point at which a slope of a tangent to the first EOTF is a predetermined slope or a second range of greater than or equal to the first code value, to extract a first region including a pixel having a code value included in the first range and a second region including a pixel having a code value included in the second range; an adjuster that adjusts a sharpness gain of the HDR video data, by increasing a sharpness gain of the first region relative to a sharpness gain of the second region in the HDR video data; and a display that displays the HDR video obtained as a result of conversion by the converter, using adjusted data obtained as a result of adjustment by the adjuster.

The general and specific aspects of the present disclosure may be implemented using a system, a method, an integrated circuit, a computer program, or a computer-readable recording medium such as CD-ROM, or any combination of systems, methods, integrated circuits, computer programs, and recording media.

Advantageous Effect of Invention

The display apparatus according to the present disclosure can effectively adjust the sharpness gain of HDR video obtained by converting HDR video data.

DESCRIPTION OF EXEMPLARY EMBODIMENT (Underlying Knowledge Forming Basis of the Present Disclosure)

The inventors found out that the display apparatus described in the "BACKGROUND ART" section has the following problems.

In a display apparatus that displays HDR video obtained by decoding HDR video data, which has been generated by performing optical electrical transfer function (OETF) conversion on master video data and encoding the master video data on the distribution side beforehand, and converting the HDR video data using a first EOTF, there are cases where the luminance data high frequency component of the master video data becomes deficient due to encoding or decoding process. In a first range that is less than a predetermined code value and corresponds to a low luminance region in the first EOTF of the display apparatus, the luminance increase width with respect to the code value increase width is smaller than in a second range that is greater than or equal to the predetermined code value and corresponds to a high luminance region. Therefore, if image processing is performed with a sharpness gain common to the whole HDR video (e.g. video of one picture) to reproduce the sharpness of the master video data, the strength of the sharpness effect achieved differs between a first region including each pixel having a code value in the first range and a second region including each pixel having a code value in the second range. In detail, the sharpness effect is weaker in the first region than in the second region.

Such a difference in sharpness effect between the first region as a low luminance region and the second region as a high luminance region in the HDR video causes a difference in vision between regions in one picture. In view of this, the present disclosure discloses a display apparatus and a display method that can effectively prevent a decrease in sharpness of HDR video obtained by converting HDR video data.

An embodiment will be described in detail below, by referring to drawings as appropriate. Herein, description detailed more than necessary may be omitted. For example, detailed description of well-known matters or repeated description of the substantially same structures may be omitted. This is to avoid unnecessarily redundant description and facilitate the understanding of a person skilled in the art.

The accompanying drawings and the following description are provided to help a person skilled in the art to fully understand the present disclosure, and are not intended to limit the subject matter defined in the appended claims.

Embodiment

An embodiment will be described below, with reference to FIGS. 1 to 14.

1. Structure

Figure 1:
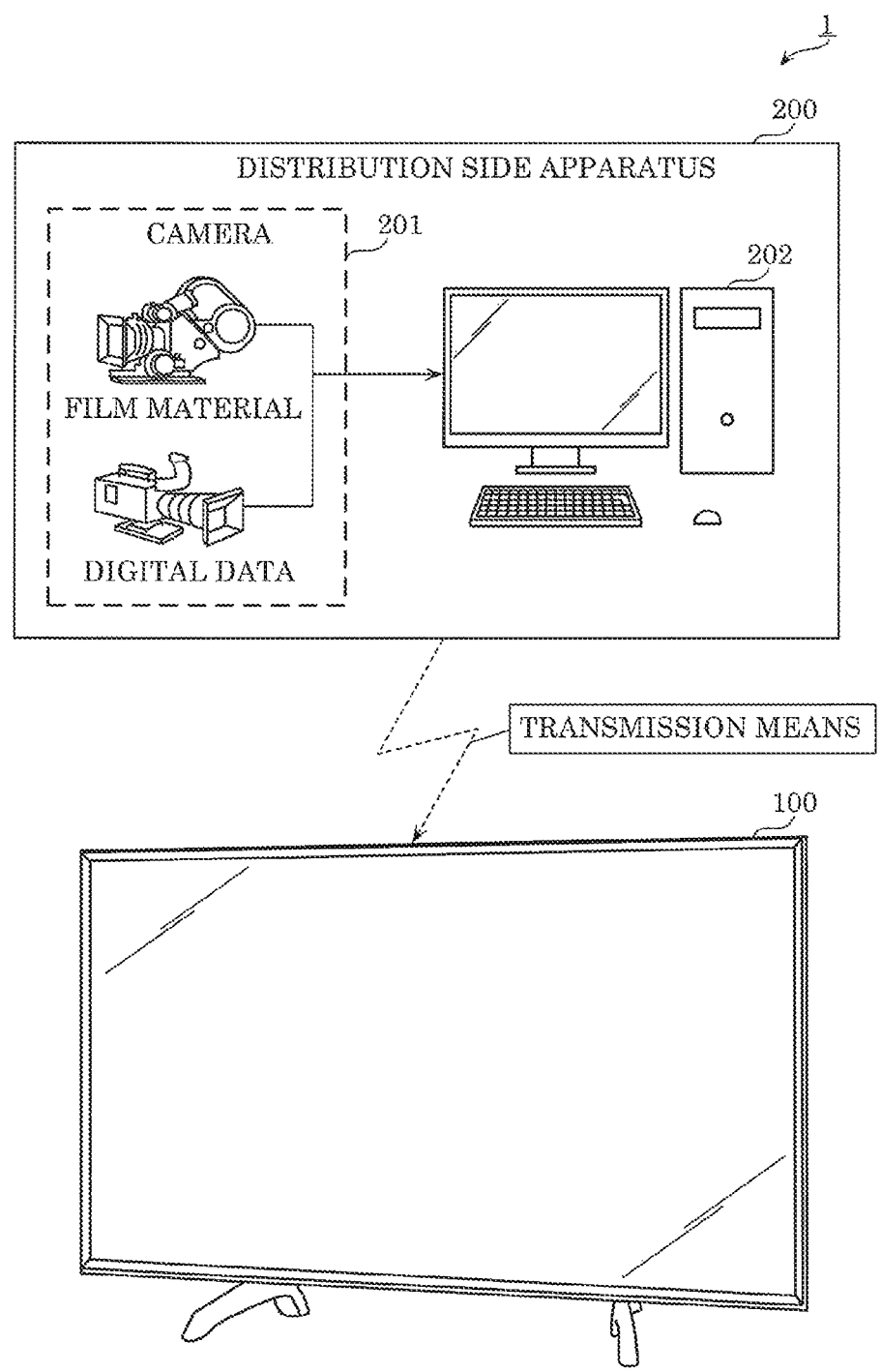
FIG. 1 is a schematic diagram illustrating a video system according to an embodiment.

FIG. 1 is a schematic diagram illustrating a video system according to this embodiment.

As illustrated in FIG. 1, video system 1 includes distribution side apparatus 200 that distributes distribution data including video data, and display apparatus 100 that receives the distributed distribution data.

Distribution side apparatus 200 includes camera 201 and information processing apparatus 202. Information processing apparatus 202 converts video captured by camera 201 such as a video camera into distribution data for transmission to display apparatus 100, and transmits the distribution data to display apparatus 100 via a transmission means.

The transmission means is a means for delivering broadcast waves in a predetermined television broadcasting standard, a means for distribution to a network such as the Internet according to a predetermined communication protocol, or a means for recording a predetermined package medium and selling the predetermined package medium. This embodiment describes an example in which the transmission means is a means for delivering broadcast waves in a predetermined television broadcasting standard.

Display apparatus 100 receives distribution data, and displays video indicated by video data included in the received distribution data. Display apparatus 100 has an appearance of a typical flat panel display in which a display device including a display panel is stored in a housing. For example, display apparatus 100 is a liquid crystal display or an organic EL display.

Figure 2:
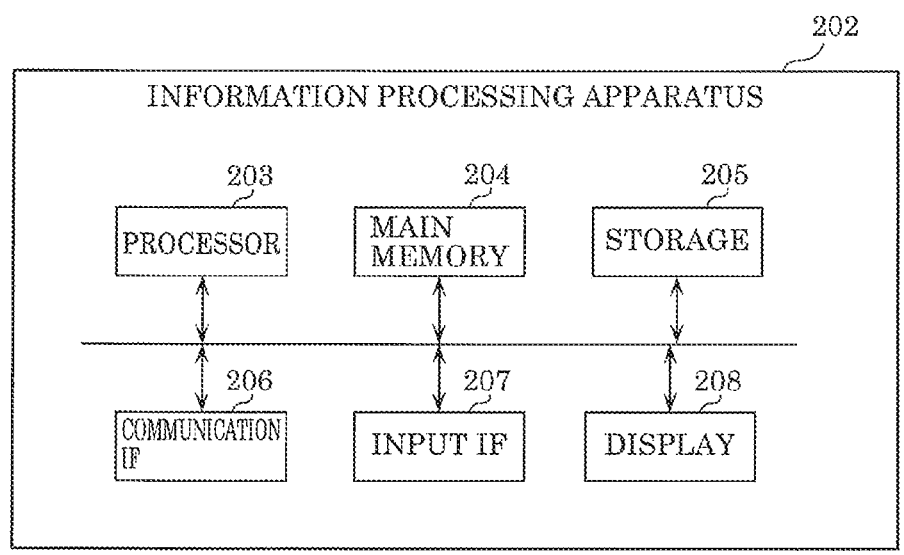
FIG. 2 is a block diagram illustrating an example of the hardware structure of an information processing apparatus according to the embodiment.

FIG. 2 is a block diagram illustrating an example of the hardware structure of the information processing apparatus according to this embodiment.

As illustrated in FIG. 2, information processing apparatus 202 includes, as its hardware structure, processor 203, main memory 204, storage 205, communication interface (IF) 106, input interface (IF) 207, and display 208.

Processor 203 is a processor that executes programs stored in storage 205 and the like.

Main memory 204 is a volatile storage area used as a work area when processor 203 executes a program.

Storage 205 is a nonvolatile storage area storing various data such as programs.

Communication IF 206 is a communication interface for communicating with an external apparatus via a communication network. For example, communication IF 206 is a wired LAN interface. Communication IF 206 may be a wireless LAN interface. Communication IF 206 is not limited to a LAN interface, and may be any communication interface capable of establishing connection for communication with the communication network.

Input IF 207 is an interface for receiving input from a person. Input IF 205 may be a pointing device such as a mouse, a touchpad, a touch panel, or a trackball, or a keyboard.

Display 208 is a master monitor for displaying video for mastering. For example, display 208 is a liquid crystal display or an organic EL display.

Figure 3:
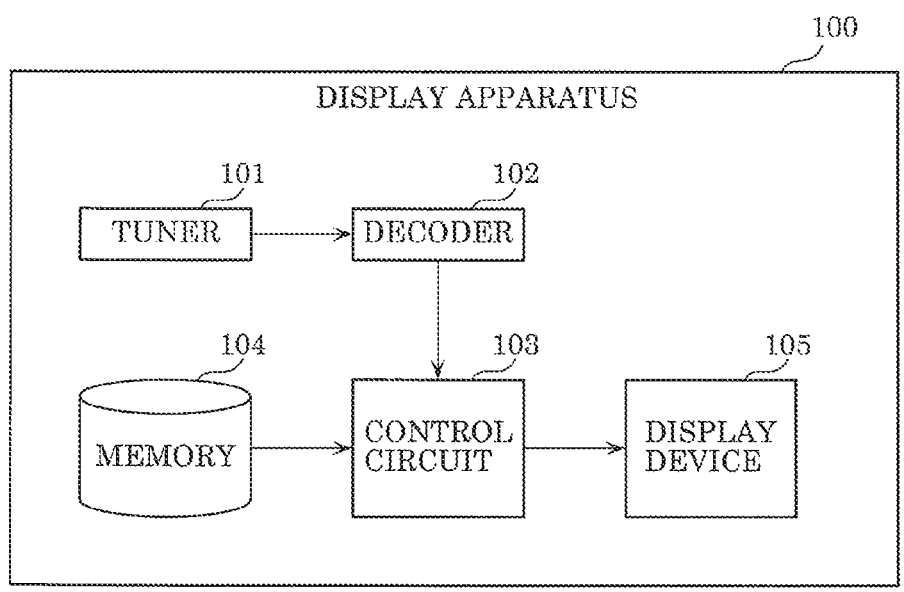
FIG. 3 is a block diagram illustrating an example of the hardware structure of a display apparatus according to the embodiment.

FIG. 3 is a block diagram illustrating an example of the hardware structure of the display apparatus according to this embodiment.

As illustrated in FIG. 3, display apparatus 100 includes tuner 101, decoder 102, control circuit 103, memory 104, and display device 105.

Tuner 101 converts an analog signal forming a broadcast wave received by an antenna (not illustrated) into encoded data which is a digital signal, and outputs the encoded data obtained as a result of the conversion to decoder 102.

Decoder 102 decodes the encoded data obtained from tuner 101, and outputs video data obtained as a result of the decoding to control circuit 103. Decoder 102 may obtain metadata, which is additional data of the video data, from tuner 101 and decode it, together with the video data. The decoded metadata is temporarily written to memory 104 by control circuit 103 (described later). The metadata is added to the video data by the distribution side beforehand, and transmitted.

Control circuit 103 performs image processing on the video data output from decoder 102, according to characteristics information indicating the characteristics of display device 105 and metadata stored in memory 104. Control circuit 103 outputs video obtained as a result of the image processing, to display device 105. Hence, display device 105 can display the video in accordance with the characteristics of display device 105 and the metadata. Decoder 102 and control circuit 103 may be implemented by the same circuit. Control circuit 103 may be implemented by a general-purpose processor such as a CPU that executes a predetermined program, or implemented by a dedicated circuit. Thus, the functions of display apparatus 100 may be implemented by software or by hardware.

Memory 104 stores the characteristics information and the metadata. Memory 104 may further store a control program. For example, memory 104 is nonvolatile memory.

Display device 105 displays the video output from control circuit 103. Display device 105 is a display panel such as a liquid crystal panel or an organic EL panel.

Figure 4:
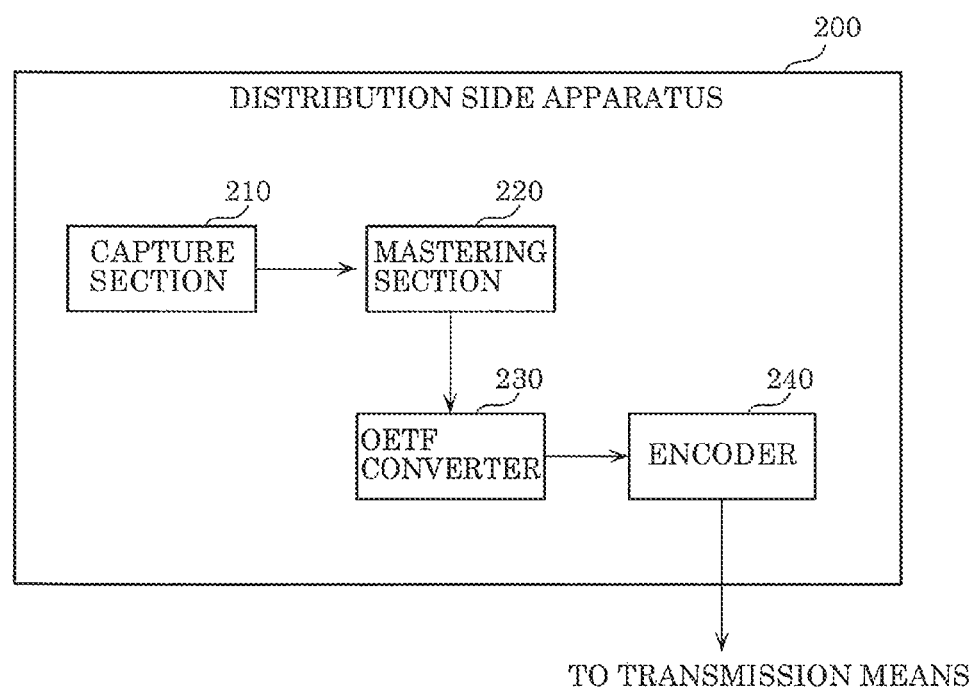
FIG. 4 is a block diagram illustrating an example of the structure of a distribution side apparatus according to the embodiment.

FIG. 4 is a block diagram illustrating an example of the structure of the distribution side apparatus according to this embodiment.

As illustrated in FIG. 4, distribution side apparatus 200 includes capture section 210, mastering section 220, opto-electronic transfer function (OETF) converter 230, and encoder 240.

Capture section 210 captures an object of video data, converts it into digital video data, and outputs the digital video data. Capture section 210 is implemented, for example, by camera 201.

Mastering section 220, while displaying the video data obtained from capture section 210 on a master monitor, performs a process of adjusting the video to luminance or color intended by the creator of the video in response to input from the creator. Mastering section 220 thus generates master data which is video data indicating video for distribution. Mastering section 220 is implemented, for example, by processor 203, main memory 204, storage 205, input IF 207, and display 208 in information processing apparatus 202.

Figure 5:
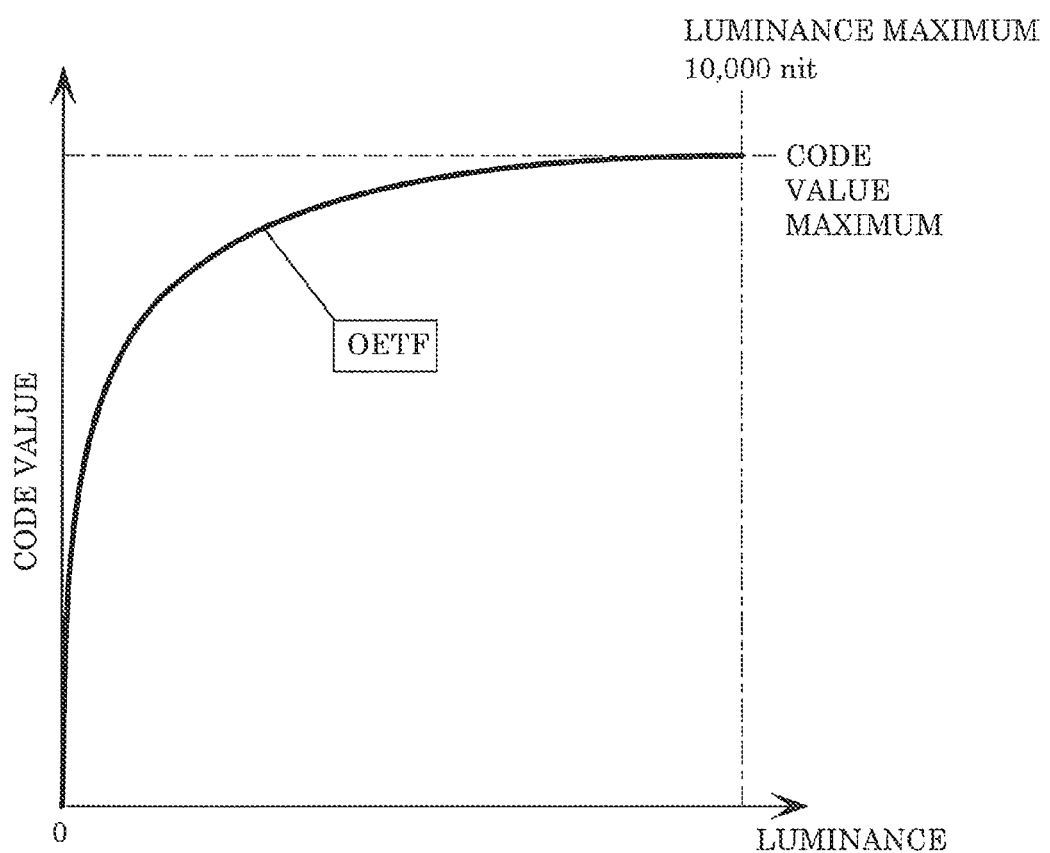
FIG. 5 is a diagram illustrating an example of an OETF according to the embodiment.

OETF converter 230 performs OETF conversion of converting luminance data adapted in the case of distributing HDR video data, into a code value using an OETF illustrated in FIG. 5. OETF converter 230 may perform the OETF conversion when distribution side apparatus 200 distributes HDR video data, or perform the OETF conversion before distribution side apparatus 200 distributes HDR video data. In the latter case, the HDR video data after the conversion is stored in storage 205. The OETF conversion has inverse conversion characteristics of the below-described EOTF conversion.

FIG. 5 is a diagram illustrating an example of the OETF according to this embodiment.

As illustrated in FIG. 5, the OETF is, for example, an inverse conversion curve of the PQ curve. The PQ curve is an EOTF curve defined in the SMPTE 2084 standard. OETF converter 230 performs the OETF conversion on the master data generated by mastering section 220, and outputs HDR video data after the conversion. OETF converter 230 is implemented, for example, by processor 203, main memory 204, and storage 205 in information processing apparatus 202.

Encoder 240 compresses the HDR video data after the conversion by OETF converter 230 according to a video compression standard, and outputs distribution data obtained as a result of the compression to a transmission path. The compressed distribution data output by encoder 240 may include data other than video data, such as audio data and metadata, although not illustrated. Encoder 240 is implemented, for example, by processor 203, main memory 204, storage 205, and communication IF 206 in information processing apparatus 202.

The functional structure of the display apparatus will be described below.

Figure 6:
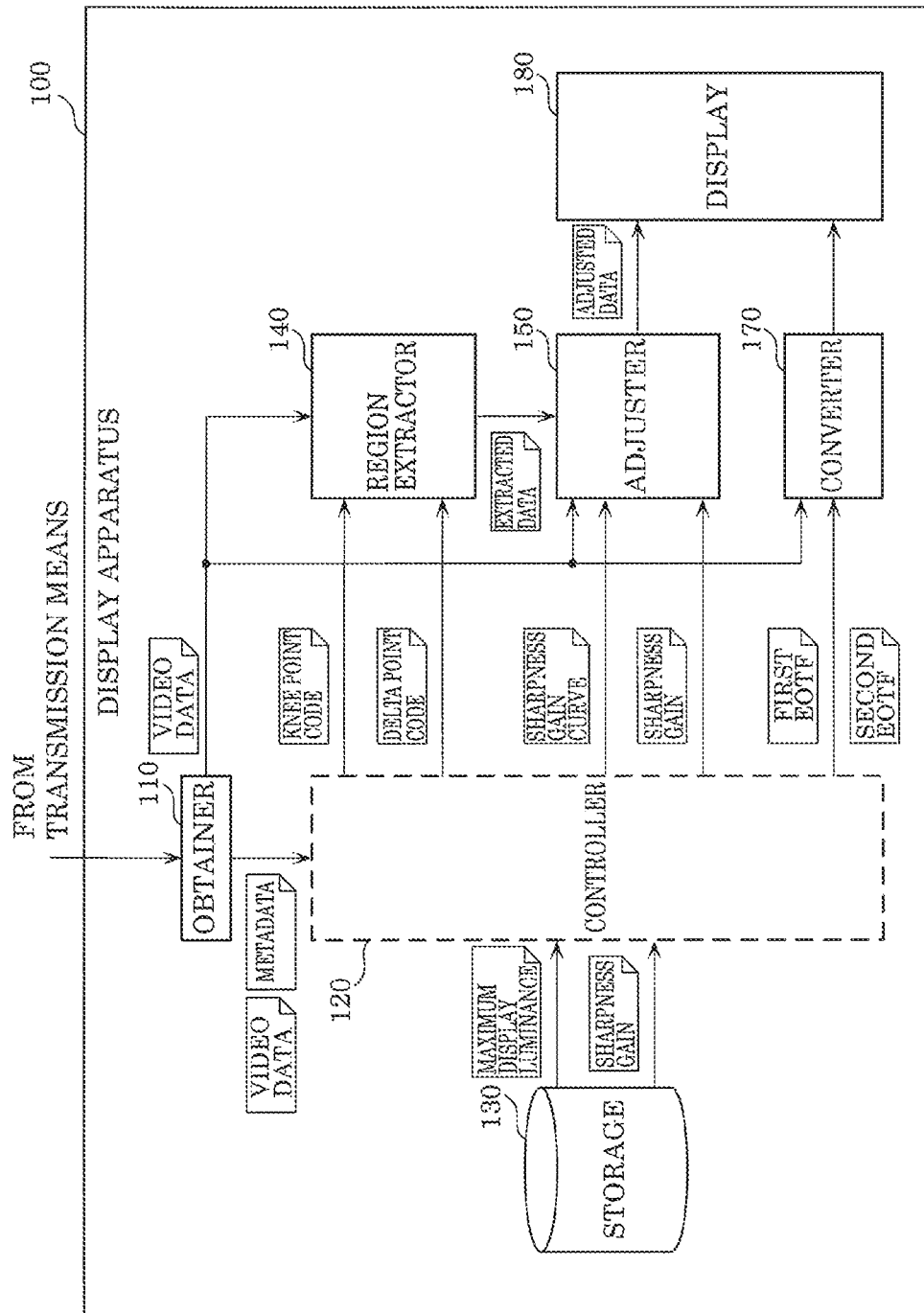
FIG. 6 is a block diagram illustrating an example of the functional structure of the display apparatus according to the embodiment.

FIG. 6 is a block diagram illustrating an example of the functional structure of the display apparatus according to this embodiment.

As illustrated in FIG. 6, display apparatus 100 includes, as its functional structure, obtainer 110, controller 120, storage 130, region extractor 140, adjuster 150, converter 170, and display 180.

Obtainer 110 obtains distribution data via the transmission means. Obtainer 110 decodes the distribution data, to obtain high dynamic range (HDR) video data. That is, obtainer 110 obtains HDR video data that has been OETF converted on the distribution side and represents the luminance of each pixel by a code value. Obtainer 110 is implemented, for example, by tuner 101, decoder 102, and the like. Obtainer 110 may obtain metadata together with the video data.

Figure 7:
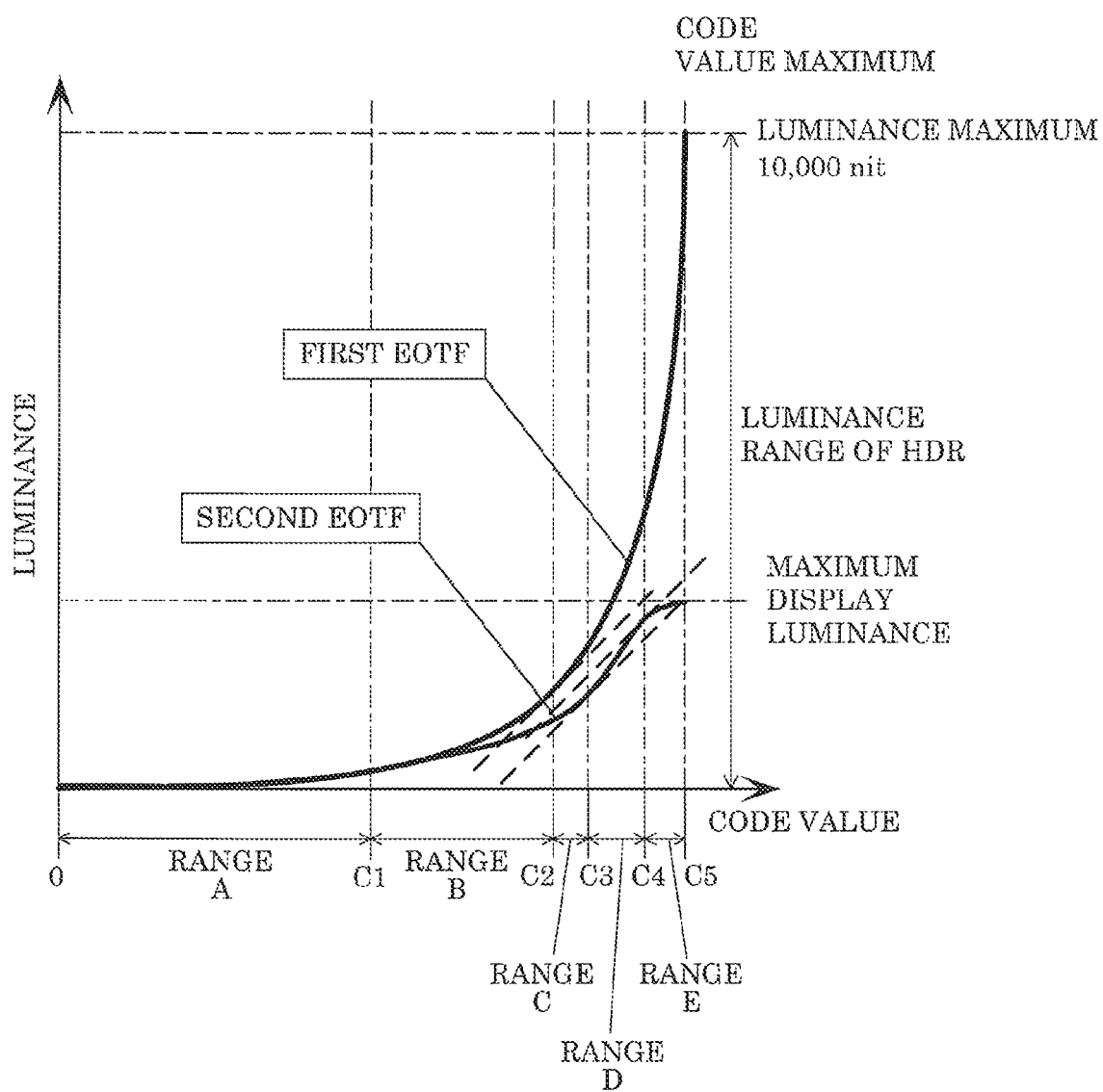
FIG. 7 is a diagram illustrating an example of a first EOTF and a second EOTF.

Controller 120 may adjust (i.e. tone mapping) a first electro-optical transfer function (EOTF) for converting a code value included in HDR video data into luminance of HDR video so that the HDR video can be displayed by display device 105, thus generating a second EOTF illustrated in FIG. 7. The first EOTF is, for example, the PQ curve. The PQ curve is an EOTF defined in the SMPTE 2084 standard. The second EOTF is, for example, a curve indicating the relationship between the code value and the luminance, which is obtained by tone mapping the first EOTF so as to set the maximum value (e.g. 10,000 nit) of the luminance of the HDR video to be maximum display luminance indicating the maximum luminance displayable by display device 105. In other words, the second EOTF is an EOTF for converting HDR video data having a code value corresponding to luminance exceeding the maximum display luminance indicating the maximum luminance displayable by display 180, into HDR video having the maximum display luminance as maximum luminance. The second EOTF has a curve different from the first EOTF, specifically, a curve lower in luminance than the first EOTF, in a range in which the code value is greater than a knee point code. FIG. 7 is a diagram illustrating an example of the first EOTF and the second EOTF. Besides the PQ curve, the hybrid log gamma (HLG) curve is also available. Whether the HDR video is subjected to opto-electronic transfer function (OETF) conversion by the PQ curve or the HLG curve is indicated in metadata, and can be determined with reference to the metadata.

As illustrated in FIG. 7, the first EOTF and the second EOTF indicate the correspondence between the code value and the luminance, and are used to convert the code value into the luminance. In other words, the first EOTF and the second EOTF are relationship information indicating the correspondence between a plurality of code values and luminance. The first EOTF and the second EOTF may each be expressed by a formula indicating the curve illustrated in FIG. 7, or expressed by a table. For example, in the case of representing the luminance of video corresponding to HDR by a 10-bit gray-scale code value, luminance in the luminance range of HDR up to 10,000 nit is quantized and mapped to 1024 integer values of 0 to 1023.

In detail, HDR video data includes an HDR signal which is a 10-bit code value obtained by quantizing the luminance of video in the luminance range up to 10,000 nit (the luminance of video corresponding to HDR) based on an OETF which is an inverse function of an EOTF. With an EOTF corresponding to HDR (hereafter referred to as "EOTF of HDR"), higher luminance can be expressed than with an EOTF corresponding to SDR (hereafter referred to as "EOTF of SDR"). For example, the maximum value of luminance (peak luminance) is 10,000 nit in the EOTF of HDR in FIG. 7. The maximum value of luminance of HDR is higher than the maximum value of luminance of SDR. HDR has a dynamic range whose maximum value has been expanded from 100 nit which is the maximum value of SDR to the maximum value of luminance of HDR (e.g. 10,000 nit).

Controller 120 analyzes the video data obtained from obtainer 110, to generate luminance characteristics information indicating the luminance characteristics of the video data used in image processing. Specifically, controller 120 generates, as the luminance characteristics information, a plurality of thresholds including knee point code C1 and delta point codes C2 to C4, and outputs the generated plurality of thresholds to region extractor 140. Controller 120 calculates knee point code C1 and delta point codes C2 to C4 as the plurality of thresholds, as follows.

Figure 8:
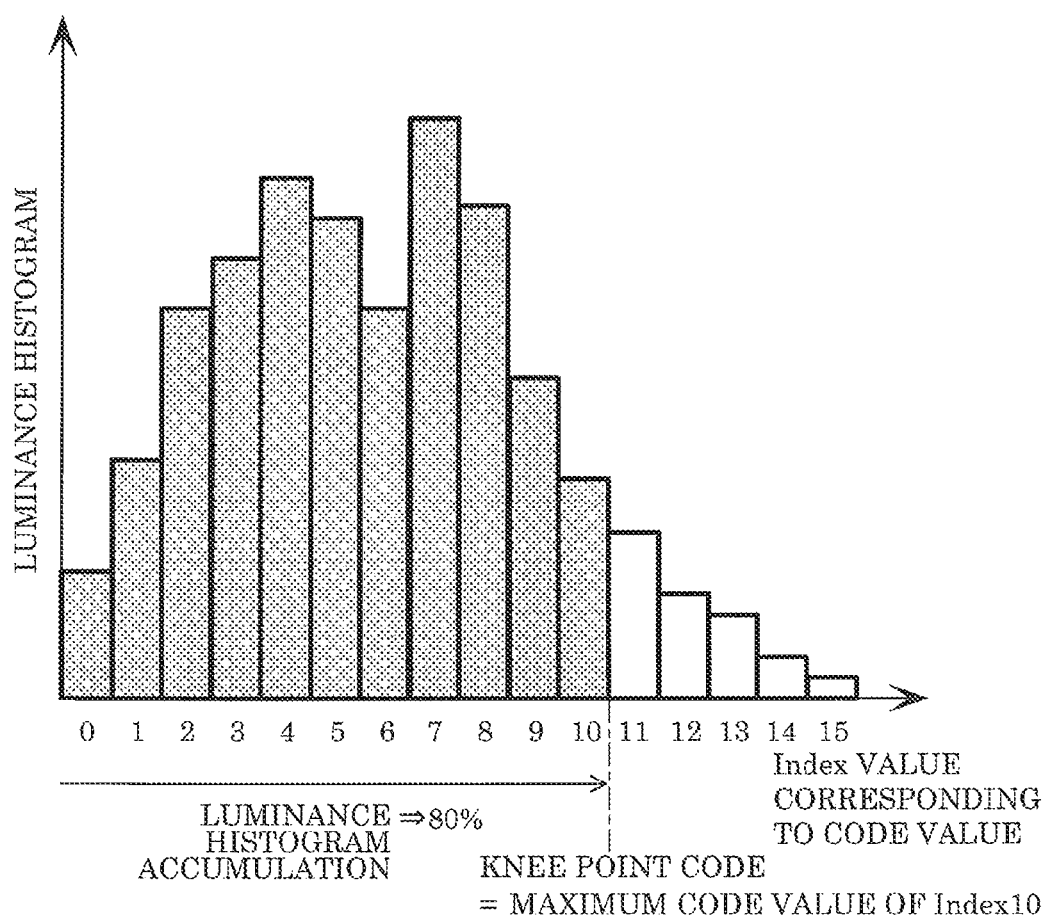
FIG. 8 is a diagram illustrating a knee point code calculation method.

FIG. 8 is a diagram illustrating a knee point code calculation method.

For example, controller 120 may calculate a code value of a pixel corresponding to an ordinal position of a number of a predetermined proportion of all of a plurality of pixels of each of a plurality of pictures of HDR video data when the plurality of pixels are arranged in ascending order of code value, and generate the calculated code value as knee point code C1. As illustrated in FIG. 8, controller 120 generates, for each of the plurality of pictures, a luminance histogram counted for each Index value corresponding to the code value of the pixel of the picture. Controller 120 then generates a code value at which the luminance histogram accumulation value corresponds to 80% of all pixels, i.e. a maximum code value in the case of extracting pixels with lower luminance up to 80% of all pixels, as knee point code C1. The distribution side may generate the histogram of video data and generate knee point code C1 beforehand in the same manner, and add knee point code C1 to metadata and transmit it.

Delta point codes C2 to C4 are each a code value corresponding to a point on an EOTF at which the slope of the tangent is a predetermined slope, as illustrated in FIG. 7. In FIG. 7, straight lines with the predetermined slope are designated by dashed lines.

Controller 120 calculates a code value corresponding to one point on the first EOTF at which the slope of the tangent is the predetermined slope, as delta point code C2. The first EOTF has a feature that the slope of the tangent to the first EOTF increases with an increase in code value. This feature of the first EOTF extends over the range of all code values of the first EOTF. Compare this with gamma correction for correcting the luminance characteristics of a display. A gamma correction curve has a feature that the slope of the tangent decreases with an increase in code value. This feature of the gamma correction curve extends over the range of all code values of the gamma correction curve. Thus, the feature of the gamma correction curve is the inverse of that of the first EOTF.

Controller 120 also calculates code values corresponding to two points on the second EOTF at which the slope of the tangent is the predetermined slope, as delta point codes C3 and C4. Delta point code C3 is a code value corresponding to a first point (change point) on the second EOTF at which the slope of the tangent changes from less than the predetermined slope to greater than or equal to the predetermined slope with an increase in code value. Delta point code C4 is a code value corresponding to a second point (change point) on the second EOTF at which the slope of the tangent changes from greater than or equal to the predetermined slope to less than the predetermined slope with an increase in code value. Thus, the second EOTF has two change points, i.e. the first and second points.

The predetermined slope is, for example, 1. The predetermined slope is not limited to 1, as long as it is a value from 0.9 to 1.1.

When calculating delta point codes C2 to C4, in the case where there is no code value corresponding to the point with the predetermined slope, that is, in the case where the point with the predetermined slope is between two code values, controller 120 may calculate a closer code value as the corresponding code value, a larger code value as the corresponding code value, or a smaller code value as the corresponding code value.

Figure 9:
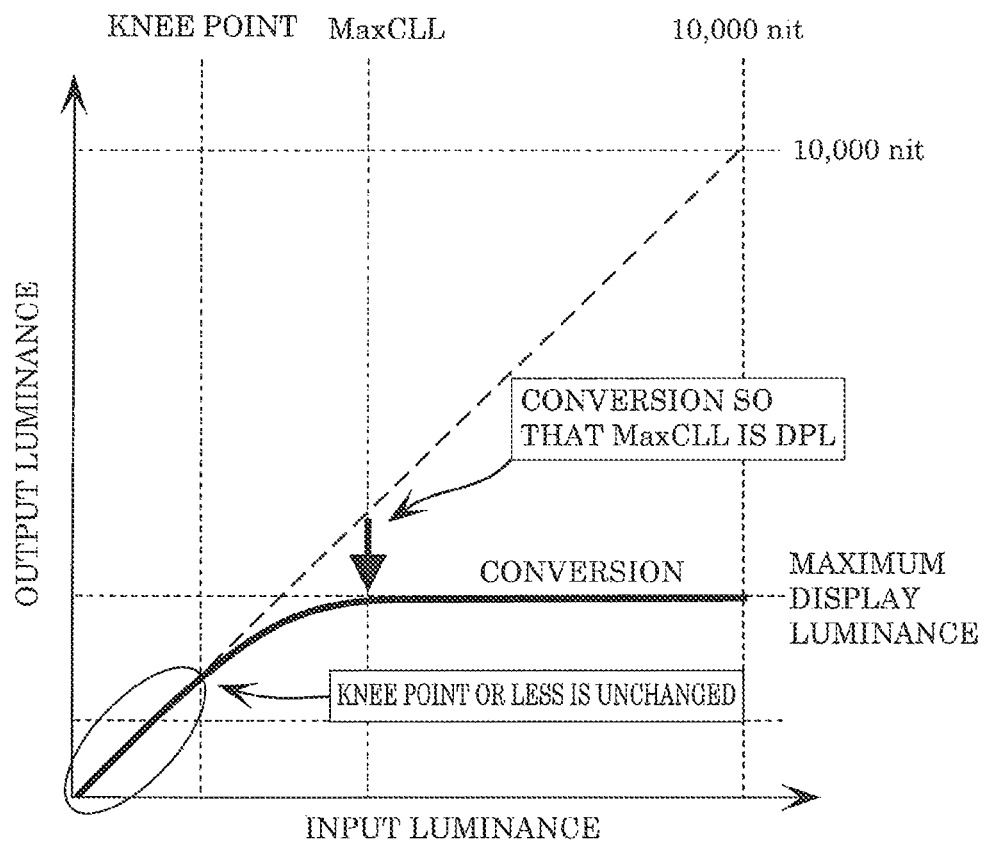
FIG. 9 is a diagram illustrating an example of tone mapping.

FIG. 9 is a diagram illustrating an example of the tone mapping.

In the tone mapping, controller 120, using a knee point of HDR video and maximum content light level (MaxCLL) from among the metadata of the HDR video data, generates the second EOTF from the first EOTF by adjusting only luminance greater than or equal to around MaxCLL without changing luminance less than or equal to the knee point between before and after the conversion.

As illustrated in FIG. 9, in the tone mapping, in the case where the luminance of the HDR video data is less than or equal to the knee point, controller 120 generates the second EOTF that sets the luminance of the HDR video data as luminance to be displayed by display device 105, without converting the luminance of the HDR video data. In the case where the luminance of the HDR video data is greater than or equal to MaxCLL, controller 120 generates the second EOTF that sets the luminance of the HDR video data to the maximum display luminance.

The knee point is luminance associated with knee point code C1 in the first EOTF. MaxCLL is a value indicating the maximum pixel luminance in all pictures included in content. In other words, MaxCLL is the maximum luminance of video or the peak luminance of video. MaxCLL and the knee point may be generated on the distribution side beforehand and transmitted as metadata.

Controller 120 may obtain a sharpness gain and a predetermined correction value (described later) for video contour correction from storage 130, and generate a sharpness gain curve based on the obtained sharpness gain and calculated knee point code C1. The sharpness gain indicates a reference value used in video contour correction. The sharpness gain curve indicates a value obtained by adjusting the reference value used in video contour correction. The sharpness gain curve includes a first sharpness gain curve used in the case of converting the HDR video data using the first EOTF, and a second sharpness gain curve used in the case of converting the HDR video data using the second EOTF.

Controller 120 is implemented, for example, by control circuit 103.

Storage 130 stores the maximum display luminance, the sharpness gain, and the predetermined correction value. Storage 130 may store other display characteristics of display apparatus 100. Storage 130 is implemented, for example, by memory 104.

Region extractor 140 determines the code value of each of all pixels constituting each of the plurality of pictures of the HDR video data, to extract regions. Specifically, for each of a plurality of ranges separated at the code values (i.e. delta point codes C2 to C4) corresponding to the points on each EOTF used by converter 170 at which the slope of the tangent is the predetermined slope and knee point code C1 as boundaries, region extractor 140 extracts each pixel having a code value included in the range, as the same region. That is, region extractor 140 extracts the respective regions corresponding to the plurality of ranges. The plurality of regions are extracted in each picture. Each of the plurality of regions may include no pixel, include only one pixel, or include a plurality of pixels. The plurality of regions can be regarded as information obtained by labeling each pixel depending on the range including its code value. A specific process of region extractor 140 will be described later. Region extractor 140 is implemented, for example, by control circuit 103.

Adjuster 150 adjusts, based on the plurality of regions extracted by region extractor 140, the sharpness in the region using the sharpness gain associated with the region. In the case where the sharpness gain is high, adjuster 150 enhances the contour of the video so as to enhance the sharpness effect. Specifically, adjuster 150 adjusts the sharpness gain of the HDR video data by increasing, in the HDR video data, the sharpness gain of a region including a pixel for which the slope of the tangent at the point on the EOTF used by converter 170 corresponding to the code value is less than the predetermined slope relative to the sharpness gain of a region including a pixel for which the slope of the tangent is greater than or equal to the predetermined slope. A specific process of adjuster 150 will be described later. Adjuster 150 is implemented, for example, by control circuit 103.

The reason for adjusting the sharpness gain is as follows. There are cases where the luminance data high frequency component of the master data generated by distribution side apparatus 200 becomes deficient due to encoding or decoding process. The OETF used by distribution side apparatus 200 has a feature that the slope of the tangent to the OETF increases with a decrease in luminance value. That is, in the video data after the OETF conversion, the low luminance side has a greater width value increase width with respect to the luminance value increase width and contains a high frequency component more, and accordingly the high frequency component tends to become deficient due to encoding or decoding process. The EOTF used in display apparatus 100 has a feature that the luminance increase width with respect to the code value increase width is smaller in a region that is less than a predetermined code value and corresponds to a low luminance region than in a region that is greater than or equal to the predetermined code value and corresponds to a high luminance region. Therefore, if image processing is performed with a common sharpness gain to the whole HDR video (video of one picture in this example) subjected to the OETF conversion, the video after the image processing has low sharpness effect in the low luminance region relative to the high luminance region, as compared with the video of the master data. The video after the image processing thus has a plurality of regions that differ in vision in one picture. To prevent such a state in which one picture has a plurality of regions that differ in vision, adjuster 150 performs adjustment of enhancing the contour of the low luminance part, by increasing, in the HDR video data, the sharpness gain of a region including a pixel for which the slope of the tangent at the point on the EOTF used by converter 170 corresponding to the code value is less than the predetermined slope relative to the sharpness gain of a region including a pixel for which the slope of the tangent is greater than or equal to the predetermined slope.

Converter 170 converts the HDR video data into HDR video using the first EOTF. Specifically, converter 170 converts the HDR video data represented by each code value into luminance corresponding to the code value in the first EOTF. Converter 170 may selectively perform conversion using the first EOTF and conversion using the second EOTF, depending on MaxCLL which is the maximum luminance of the HDR video data. Specifically, converter 170 compares MaxCLL and the maximum display luminance of display device 105, and performs conversion using the second EOTF in the case where MaxCLL is greater than the maximum display luminance, and performs conversion using the first EOTF in the case where MaxCLL is less than or equal to the maximum display luminance. By comparing MaxCLL indicating the maximum luminance of the video of the video data and included in the video data as metadata and the maximum display luminance stored in storage 130 as the maximum luminance of display device 105 and performing conversion using the second EOTF in the case where the maximum luminance of the video is greater than the maximum display luminance, converter 170 can adjust the maximum luminance of the video to luminance corresponding to the maximum display luminance.

Converter 170 may switch between the first EOTF and the second EOTF for each picture of the HDR video data, using the maximum luminance of the picture instead of MaxCLL. Converter 170 may switch between the first EOTF and the second EOTF for each scene of the HDR video data, using the maximum luminance of the scene instead of MaxCLL.

Converter 170 is implemented, for example, by control circuit 103.

Display 180 displays the HDR video obtained as a result of the conversion by converter 170, using adjusted data obtained as a result of the adjustment by adjuster 150. In the case where the video data obtained by obtainer 110 is SDR video data, display 180 may display SDR video. Display 180 is implemented, for example, by display device 105.

Specific processes of region extractor 140 and adjuster 150 will be described below, with reference to FIGS. 10 and 11.

Figure 10:
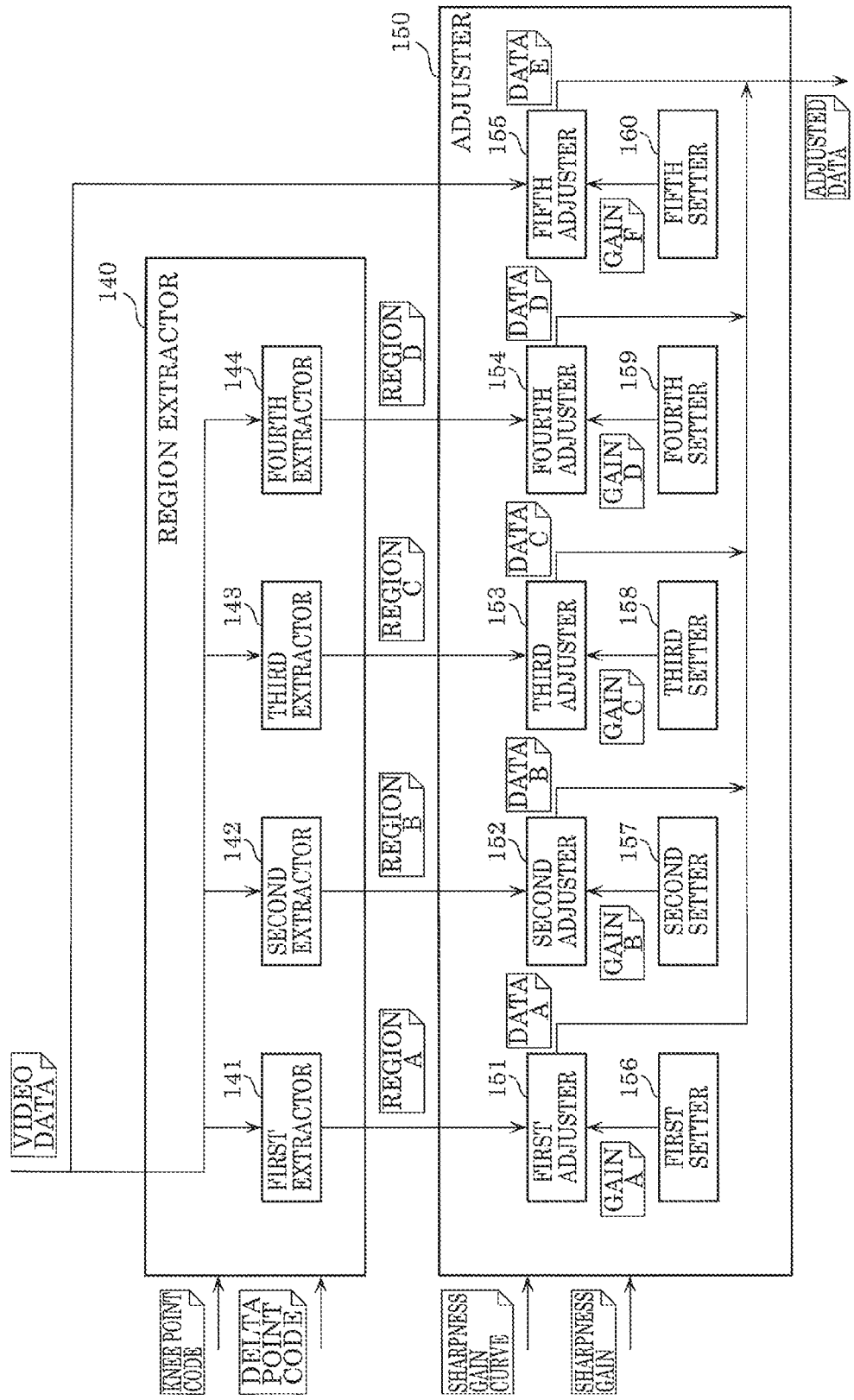
FIG. 10 is a block diagram illustrating an example of the detailed structure of a region extractor and an adjuster.

FIG. 10 is a block diagram illustrating an example of the detailed structure of the region extractor and the adjuster. FIG. 11B is a diagram illustrating an example of the sharpness gain and the sharpness gain after adjustment in each range.

As illustrated in FIG. 10, region extractor 140 includes first extractor 141, second extractor 142, third extractor 143, and fourth extractor 144. First extractor 141 to fourth extractor 144 perform the following respective processes, using the video data obtained by obtainer 110 and any of knee point code C1 and delta point codes C2 to C4 calculated by controller 120.

First extractor 141 extracts, using the HDR video data, a region including each pixel of less than knee point code C1 as region A, both in the case where converter 170 performs conversion using the first EOTF and in the case where converter 170 performs conversion using the second EOTF. That is, first extractor 141 extracts each pixel having a code value included in the first range in FIG. 11, as region A. As illustrated in FIG. 7, region A is a region lowest in luminance.

Second extractor 142 extracts, using the HDR video data, a region including each pixel of greater than or equal to knee point code C1 and less than delta point code C2 as region B, in the case where converter 170 performs conversion using the first EOTF. Thus, in this case, second extractor 142 extracts each pixel having a code value included in the second range in FIG. 11, as region B.

Moreover, second extractor 142 extracts, using the HDR video data, a region including each pixel of greater than or equal to knee point code C1 and less than delta point code C3 as region B, in the case where converter 170 performs conversion using the second EOTF. Thus, in this case, second extractor 142 extracts each pixel having a code value included in the second range and the third range in FIG. 11, as region B. Region B is higher in luminance than region A.

Third extractor 143 extracts, using the HDR video data, a region including each pixel of greater than or equal to delta point code C2 as region C, in the case where converter 170 performs conversion using the first EOTF. Thus, in this case, third extractor 143 extracts each pixel having a code value included in the third range, the fourth range, and the fifth range in FIG. 11, as region C.

Moreover, third extractor 143 extracts, using the HDR video data, a region including each pixel of greater than or equal to delta point code C3 and less than delta point code C4 as region C, in the case where converter 170 performs conversion using the second EOTF. Thus, in this case, third extractor 143 extracts each pixel having a code value included in the fourth range in FIG. 11, as region C. Region C is higher in luminance than region B.

Fourth extractor 144 performs no process in the case where converter 170 performs conversion using the first EOTF. Fourth extractor 144 extracts, using the HDR video data, a region including each pixel of greater than or equal to delta point code C4 as region D, in the case where converter 170 performs conversion using the second EOTF. Thus, in this case, fourth extractor 144 extracts each pixel having a code value included in the fifth range in FIG. 11, as region D. Region D is higher in luminance than region C in the second EOTF.

Thus, in the case where converter 170 performs conversion using the first EOTF, region extractor 140 determines, for each pixel of the HDR video data, which of range A (i.e. third range) of less than knee point code C1, range B (i.e. fourth range) of greater than or equal to knee point code C1 and less than delta point code C2, and ranges C to E (i.e. second range) of greater than or equal to delta point code C2 the code value of the pixel is included in. Region extractor 140 extracts region A (i.e. third region) including each pixel in range A, region B (i.e. fourth region) including each pixel in range B, and region C (i.e. second region) including each pixel in ranges C to E, depending on the determination result.

In the case where converter 170 performs conversion using the second EOTF, region extractor 140 determines, for each pixel of the HDR video data, which of range A (i.e. ninth range) of less than knee point code C1, ranges B and C (i.e. tenth range) of greater than or equal to knee point code C1 and less than delta point code C3, range D (i.e. sixth range) of greater than or equal to delta point code C3 and less than delta point code C4, and range E (i.e. eighth range) of greater than or equal to delta point code C4 the code value of the pixel is included in. Region extractor 140 extracts region A (i.e. ninth region) including each pixel in range A, region B (i.e. tenth region) including each pixel in ranges B and C, region C (i.e. sixth region) including each pixel in range D, and region D (i.e. eighth region) including each pixel in range E, depending on the determination result.

Since regions A, B, C, and D can be separated by the level of luminance, regions A, B, C, and D can be extracted by comparing the code value of the input video data and knee point code C1 and delta point codes C2, C3, and C4 as thresholds.

As illustrated in FIG. 10, adjuster 150 includes first adjuster 151, second adjuster 152, third adjuster 153, fourth adjuster 154, fifth adjuster 155, first setter 156, second setter 157, third setter 158, fourth setter 159, and fifth setter 160. First setter 156 to fifth setter 160 perform the following respective processes, using the sharpness gain and the sharpness gain curve output from controller 120.

First setter 156 sets gain A to difference value $\Delta G_B$ from the reference value in range A using the sharpness gain and the first sharpness gain curve or the second sharpness gain curve, both in the case where converter 170 performs conversion using the first EOTF and in the case where converter 170 performs conversion using the second EOTF. Gain A is a positive value. First adjuster 151 adjusts the sharpness gain of region A using gain A, and outputs data A resulting from the adjustment.

Second setter 157 sets gain B to difference value $\Delta G_A$ from the reference value in range B using the sharpness gain and the first sharpness gain curve, in the case where converter 170 performs conversion using the first EOTF. Gain B is a positive value. Second adjuster 152 adjusts the sharpness gain of region B using gain B, and outputs data B resulting from the adjustment.

Moreover, second setter 157 sets gain B to difference value $\Delta G_B$ from the reference value in ranges B and C using the sharpness gain and the second sharpness gain curve, in the case where converter 170 performs conversion using the second EOTF. Gain B is a positive value. Second adjuster 152 adjusts the sharpness gain of region B using gain B, and outputs data B resulting from the adjustment.

Third setter 158 sets gain C to difference value $\Delta G_D$ from the reference value in ranges C to E using the sharpness gain and the first sharpness gain curve, in the case where converter 170 performs conversion using the first EOTF. Gain C is a negative value. Third adjuster 153 adjusts the sharpness gain of region C using gain C, and outputs data C resulting from the adjustment.

Moreover, third setter 158 sets gain C to difference value $\Delta G_C$ from the reference value in range D using the sharpness gain and the second sharpness gain curve, in the case where converter 170 performs conversion using the second EOTF. Gain C is a negative value. Third adjuster 153 adjusts the sharpness gain of region C using gain C, and outputs data C resulting from the adjustment.

Fourth setter 159 and fourth adjuster 154 perform no process in the case where converter 170 performs conversion using the first EOTF. Fourth setter 159 sets gain D to difference value $\Delta G_B$ from the reference value in range E using the sharpness gain and the second sharpness gain curve, in the case where converter 170 performs conversion using the second EOTF. Gain D is a positive value. Fourth adjuster 154 adjusts the sharpness gain of region D using gain D, and outputs data D resulting from the adjustment.

Fifth setter 160 sets the sharpness gain of the reference value as gain E, both in the case where converter 170 performs conversion using the first EOTF and in the case where converter 170 performs conversion using the second EOTF. Fifth adjuster 155 adjusts the sharpness gain of the whole region of the HDR video data using gain E, and outputs data E resulting from the adjustment.

In the case where converter 170 performs conversion using the first EOTF, adjuster 150 outputs adjusted data generated by respectively adding data A to C obtained by adjusting the sharpness gain by gains A to C corresponding to regions A to C, to regions A to C of data E obtained by adjusting the sharpness gain of the whole region by the reference value. In the case where converter 170 performs conversion using the second EOTF, adjuster 150 outputs adjusted data generated by respectively adding data A to D obtained by adjusting the sharpness gain by gains A to D corresponding to regions A to D, to regions A to D of data E obtained by adjusting the sharpness gain of the whole region by the reference value.

Thus, in the case where converter 170 performs conversion using the first EOTF, adjuster 150 increases the sharpness gain of region A (i.e. third region) from the reference value by difference value $\Delta G_B$ (i.e. first value), increases the sharpness gain of region B (i.e. fourth region) from the reference value by difference value $\Delta G_A$ (i.e. second value) less than difference value $\Delta G_B$, and decreases the sharpness gain of region C (i.e. second region) from the reference value by difference value $\Delta G_D$ (i.e. third value).

Suppose Δluminance/Δcode value is a slope at one point in FIG. 7. Then, it can be regarded that the slope of the tangent at delta point code C2 on the first EOTF is 1.0, the average of the slope of the tangent in range A from the point of 0 in code value to knee point code C1 is 0.05, the average of the slope of the tangent in range B from knee point code C1 to delta point code C2 is 0.33, and the average of the slope of the tangent in ranges C to E from delta point code C2 to maximum code value C5 is 3.3. The number of tangents assigned to each of range A, range B, and ranges C to E may be one or four. The slope of one tangent selected from the tangents assigned to each of range A, range B, and ranges C to E may be determined as a representative value, or the average of the slopes of a plurality of tangents selected from the tangents assigned to each of range A, range B, and ranges C to E may be determined as a representative value. The slope of the tangent of each of range A, range B, and ranges C to E calculated in this way serves as basic data for calculating the sharpness gain curve of the region corresponding to the range.

For example, suppose the sharpness gain curve at delta point code C2 is defined as 1.0 equal to the sharpness gain. Since the average of the slope of the tangent in range A is 0.05, the sharpness gain curve of range A is $1.0\times(1/0.05)=20.0$. Accordingly, $\Delta G_B$ equivalent to 20.0 is set in range A. Likewise, since the average of the slope of the tangent in range B is 0.33, the sharpness gain curve of range B is $1.0\times(1/0.33)=3.0$, and $\Delta G_A$ equivalent to 3.0 is set. Since the average of the slope of the tangent in ranges C to E is 3.3, the sharpness gain curve of ranges C to E is $1.0\times(1/3.3)=0.3$, and $\Delta G_D$ (negative value as it is less than or equal to 1.0) equivalent to 0.3 is set.

As described above, each of difference values $\Delta G_A$, $\Delta G_B$, and $\Delta G_D$ is set based on the sharpness gain curve calculated by multiplication of the sharpness gain curve at delta point code C2 as a reference value and the slope of each tangent. The calculated sharpness gain may be directly used. A limiter may be provided to set an upper limit and a lower limit. Each difference value may be rounded. For example, in the case where a limiter of maximum 5.0 (i.e. upper limit) and minimum 0.4 (i.e. lower limit) is provided, the sharpness gain curve is 5.0 in range A, 3.0 in range B, and 0.4 in range C. Values achieving these sharpness gains are set as difference values $\Delta G_A$, $\Delta G_B$, and $\Delta G_D$.

Figure 11:
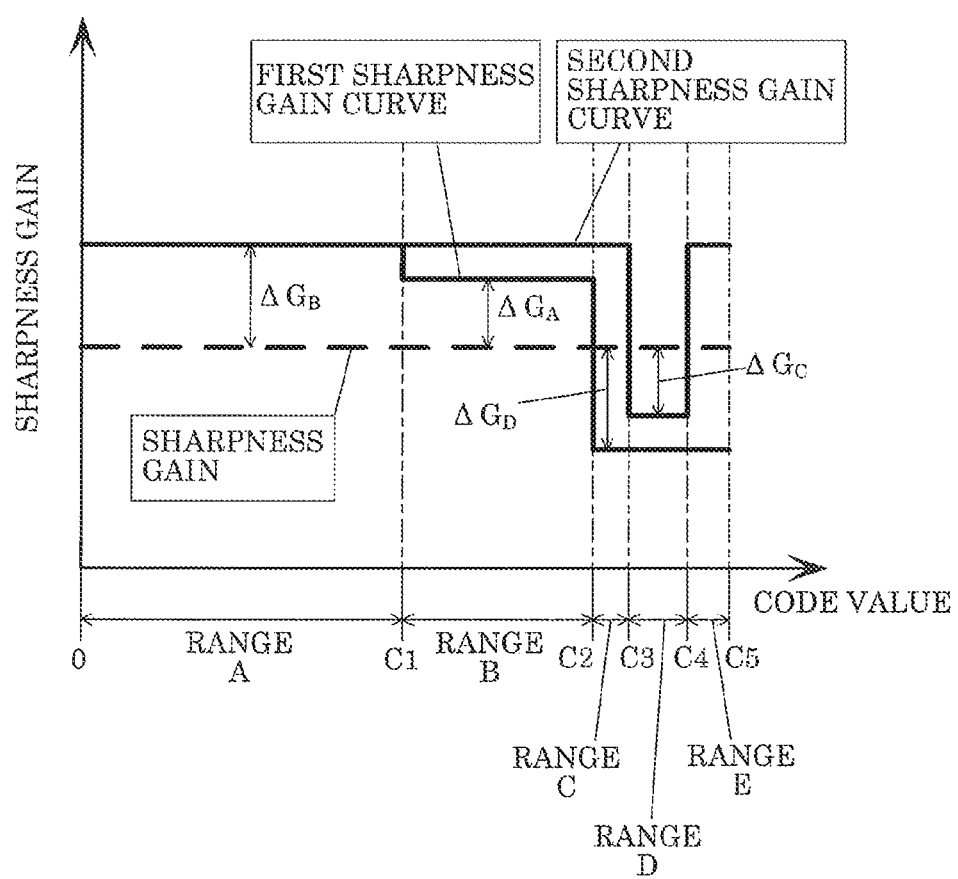
FIG. 11 is a diagram illustrating an example of a sharpness gain and a sharpness gain adjusted in each range.

The sharpness gain curve in FIG. 11 has a shape that is offset without a slope, at knee point code C1 and delta point code C2. The sharpness gain curve is, however, not limited to this, and may have a sloped shape at knee point code C1 and delta point code C2. For example, the sharpness gain curve may have the sharpness gain at delta point code C2 equal to the sharpness gain, have a shape that gently increases with a constant slope as it approaches knee point code C1 from delta point code C2 without immediately increasing to $\Delta G_A$, and have a shape that gently decreases with a constant slope as it approaches delta point code C3 from delta point code C2 without immediately decreasing to $\Delta G_D$.

Thus, in the case of displaying the HDR video obtained using the first EOTF in display apparatus 100, the third region and the fourth region are separated at the knee point code as a boundary in the first region, and the sharpness gain of the third region is increased relative to the sharpness gain of the fourth region, to uniformize the sharpness gain change rate between different pixels. This allows, in the first region, the sharpness effect of the third region to be closer to the sharpness effect of the fourth region as a high luminance region. Hence, a decrease in sharpness of the HDR video obtained by converting the HDR video data using the first EOTF can be prevented effectively.

In the case where converter 170 performs conversion using the second EOTF, adjuster 150 increases the sharpness gain of region A (i.e. ninth region) from the reference value by difference value $\Delta G_B$ (i.e. fourth value), increases the sharpness gain of region B (i.e. tenth region) from the reference value by difference value $\Delta G_B$ (i.e. fourth value), decreases the sharpness gain of region C (i.e. sixth region) from the reference value by difference value $\Delta G_C$ (i.e. fifth value), and increases the sharpness gain of region D (i.e. eighth region) from the reference value by difference value $\Delta G_B$ (i.e. fourth value).

Suppose Δluminance/Δcode value is a slope at one point in FIG. 7, as in the case of the first EOTF. Then, it can be regarded that the slope of the tangent at delta point code C3 and delta point code C4 on the second EOTF is 1.0, the average of the slope of the tangent in range A is 0.05, the average of the slope of the tangent in ranges B to C from knee point code C1 to delta point code C3 is 0.22, the average of the slope of the tangent in range D from delta point code C3 to delta point code C4 is 1.5, and the average of the slope of the tangent in range E from delta point code C4 to maximum code value C5 is 0.5. The slope of the tangent of each of range A, ranges B to C, range D, and range E serves as basic data for calculating the sharpness gain curve of the region corresponding to the range.

For example, suppose the sharpness gain curve at delta point codes C3 and C4 is defined as 1.0 equal to the sharpness gain. Since the average of the slope of the tangent in range A is 0.05, the sharpness gain curve of range A is $1.0\times(1/0.05)=20.0$. Accordingly, $\Delta G_B$ equivalent to 20.0 is set in range A. Likewise, since the average of the slope of the tangent in ranges B to C is 0.22, the sharpness gain curve of ranges B to C is $1.0\times(1/0.22)=4.5$, and $\Delta G_B$ equivalent to 4.5 is set. Since the average of the slope of the tangent in range D is 1.5, the sharpness gain curve of range D is $1.0\times(1/1.5)=0.6$, and $\Delta G_C$ equivalent to 0.6 is set. Since the average of the slope of the tangent in range E is 0.5, the sharpness gain curve of range E is $1.0\times(1/0.5)=2.0$, and $\Delta G_B$ equivalent to 2.0 is set.

As described above, each difference value is set based on the sharpness gain curve calculated by multiplication of the sharpness gain curve at delta point codes C3 and C4 as a reference value and the slope of each tangent. The calculated sharpness gain may be directly used. A limiter may be provided to set an upper limit and a lower limit. Each difference value may be rounded. For example, in the case where a limiter of maximum 5.0 (i.e. upper limit) and minimum 0.7 (i.e. lower limit) is provided and a difference value that differs from the difference value of the first EOTF by 1.5 or less is rounded, the sharpness gain curve is 5.0 in range A, 5.0 in ranges B to C, 0.6 in range D, and 2.0 in range E. Values achieving these sharpness gains are set as difference values $\Delta G_B$ and $\Delta G_C$.

The sharpness gain curve in FIG. 11 has a shape that is offset without a slope, at delta point codes C3 and C4. The sharpness gain curve is, however, not limited to this, and may have a sloped shape at delta point codes C3 and C4. For example, the sharpness gain curve may have the sharpness gain at delta point code C3 equal to the sharpness gain, have a shape that gently increases with a constant slope as it approaches knee point code C1 from delta point code C3 without immediately increasing to $\Delta G_B$, and have a shape that gently decreases with a constant slope as it approaches delta point code C4 from delta point code C3 without immediately decreasing to $\Delta G_C$. For delta point code C4, too, the sharpness gain curve may have the sharpness gain at delta point code C4 equal to the sharpness gain, have a shape that gently decreases with a constant slope as it approaches delta point code C3 from delta point code C4 without immediately decreasing to $\Delta G_C$, and have a shape that gently increases with a constant slope as it approaches maximum code value C5 from delta point code C4 without immediately increasing to $\Delta G_B$.

Thus, in the case of displaying the HDR video obtained using the second EOTF in display apparatus 100, too, the sharpness gain is adjusted depending on the slope of the tangent as in the case of using the first EOTF. Hence, a decrease in sharpness of the HDR video obtained by converting the HDR video data using the second EOTF can be prevented effectively.

Moreover, in the case of displaying the HDR video obtained using the second EOTF having two change points, i.e. the first and second points, in display apparatus 100, the sharpness gain is adjusted depending on the slope of the tangent as in the case of using the first EOTF. Hence, a decrease in sharpness of the HDR video obtained by converting the HDR video data using the second EOTF can be prevented effectively.

In display apparatus 100, the same process is performed in region A both in the case of using the first EOTF and in the case of using the second EOTF. In other words, first extractor 141, first adjuster 151, and second setter 157 can be shared in the case of using the first EOTF and in the case of using the second EOTF. This reduces structural elements, and prevents a cost increase.

In display apparatus 100, the sharpness gain including the code value of range B is different between in the case of using the first EOTF and in the case of using the second EOTF. In detail, the sharpness gain can be made different between in the case of using the first EOTF and in the case of using the second EOTF, with respect to the knee point. A decrease in sharpness of the HDR video can thus be prevented effectively. In the case where the distribution side generates the knee point code and transmits it using metadata, too, in the display apparatus the sharpness gain can be made different between in the case of using the first EOTF and in the case of using the second EOTF with respect to the knee point code generated on the distribution side.

In adjuster 150, second adjuster 152 that adjusts the sharpness gain of region B (i.e. fourth region) in the case where converter 170 performs conversion using the first EOTF adjusts the sharpness gain of region B (i.e. tenth region) in the case where converter 170 performs conversion using the second EOTF. As mentioned above, in the case where converter 170 performs conversion using the first EOTF and in the case where converter 170 performs conversion using the second EOTF, second extractor 142 extracts different regions as region B and second setter 157 sets different values as gain B. Therefore, second adjuster 152 can be shared.

Likewise, in adjuster 150, third adjuster 153 that adjusts the sharpness gain of region C (i.e. second region) in the case where converter 170 performs conversion using the first EOTF adjusts the sharpness gain of region C (i.e. sixth region) in the case where converter 170 performs conversion using the second EOTF. As mentioned above, in the case where converter 170 performs conversion using the first EOTF and in the case where converter 170 performs conversion using the second EOTF, third extractor 143 extracts different regions as region C and third setter 158 sets different values as gain C. Therefore, third adjuster 153 can be shared.

Thus, in display apparatus 100, second adjuster 152 and third adjuster 153 can be shared in the case of using the first EOTF and in the case of using the second EOTF. This reduces structural elements, and prevents a cost increase.

2. Operations

The operations of display apparatus 100 will be described below, with reference to FIGS. 12 to 14.

Figure 12:
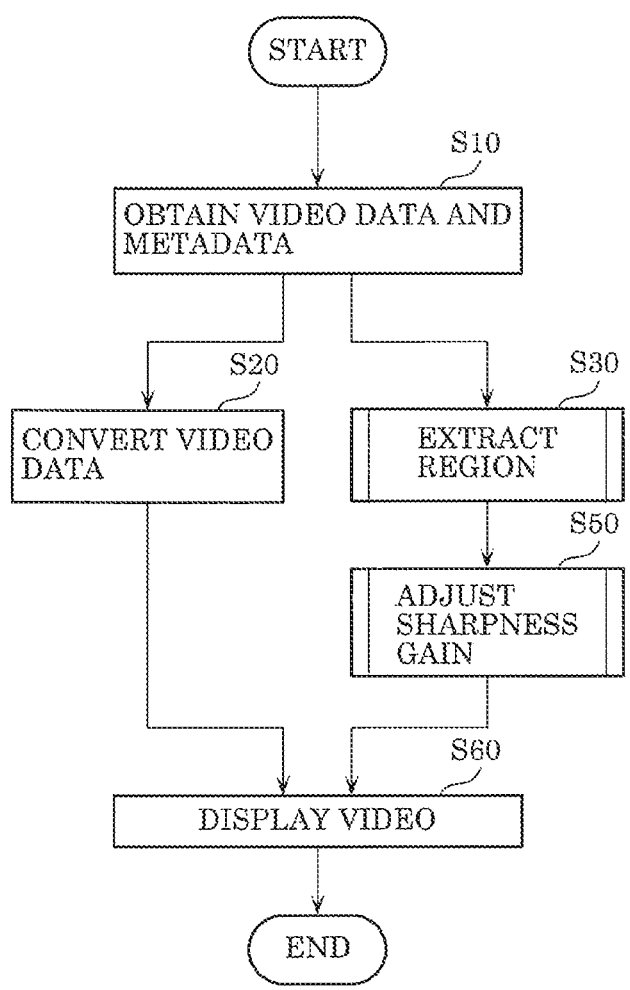
FIG. 12 is a flowchart illustrating an example of a display method by the display apparatus according to the embodiment.

FIG. 12 is a flowchart illustrating an example of a display method by the display apparatus according to this embodiment.

In display apparatus 100, obtainer 110 obtains video data (S10). Obtainer 110 may obtain metadata together with the video data.

Next, converter 170 converts the video data into video using an EOTF (S20). Specifically, in the case where the video data is HDR video data, converter 170 converts the HDR video data into HDR video using an EOTF corresponding to HDR. For example, in the case where MaxCLL of the HDR video data is less than or equal to the maximum display luminance, converter 170 converts the HDR video data into HDR video using the first EOTF. In the case where MaxCLL of the HDR video data is greater than the maximum display luminance, converter 170 converts the HDR video data into HDR video using the second EOTF. In the case where the video data is SDR video data, converter 170 converts the SDR video data into SDR video using an EOTF corresponding to SDR.

In the case where the video data is HDR video data, region extractor 140 performs an extraction process of determining the code value of each of all pixels constituting each of a plurality of pictures of the HDR video data to extract the plurality of regions A to D (S30). The extraction process will be described in detail later.

Next, adjuster 150 performs an adjustment process of adjusting, based on the plurality of regions A to D extracted by region extractor 140, the sharpness in the region using the sharpness gain associated with the region (S50). The adjustment process will be described in detail later.

In the case where the video data is SDR video data, region extractor 140 and adjuster 150 need not perform any process.

Lastly, display 180 displays HDR video obtained as a result of the conversion by converter 170, using adjusted data obtained as a result of the adjustment by adjuster 150 (S60). In the case where the video data is SDR video data, display 180 may display SDR video obtained as a result of the conversion by converter 170.

Steps S20, S30, and S50 may be performed in parallel, or performed in times that do not overlap with each other.

The extraction process of extracting the regions will be described in detail below, with reference to FIG. 13.

Figure 13:
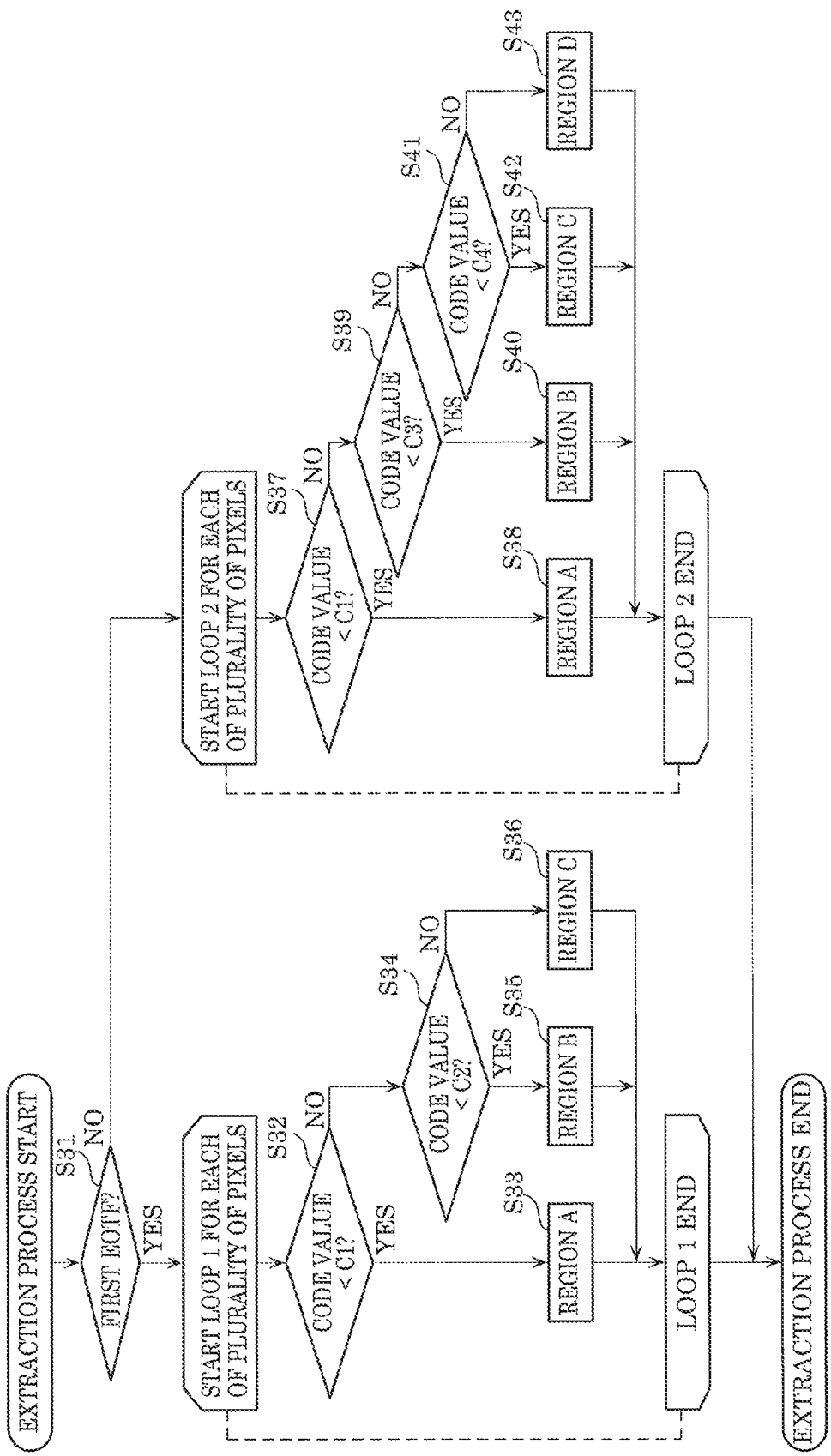
FIG. 13 is a flowchart illustrating an example of an extraction process of extracting regions.

FIG. 13 is a flowchart illustrating an example of the extraction process of extracting the regions.

When the extraction process starts, region extractor 140 in display apparatus 100 determines whether converter 170 performs conversion using the first EOTF (S31).

In the case where region extractor 140 determines that converter 170 performs conversion using the first EOTF (S31: Yes), region extractor 140 executes Loop 1 for each of the plurality of pixels constituting each of the plurality of pictures of the HDR video data.

When Loop 1 starts, region extractor 140 determines whether the code value of the pixel is less than knee point code C1 (S32).

In the case where the code value of the pixel is less than knee point code C1 (S32: Yes), region extractor 140 determines that the pixel is included in region A (S33). Region extractor 140 may store an extraction result indicating that the pixel is in region A, in storage 130. Specifically, first extractor 141 performs the process in Step S33.

In the case where the code value of the pixel is greater than or equal to knee point code C1 (S32: No), region extractor 140 determines whether the code value is less than delta point code C2 (S34).

In the case where the code value of the pixel is less than delta point code C2 (S34: Yes), region extractor 140 determines that the pixel is included in region B (S35). Region extractor 140 may store an extraction result indicating that the pixel is in region B, in storage 130. Specifically, second extractor 142 performs the process in Step S35.

In the case where the code value of the pixel is greater than or equal to delta point code C2 (S34: No), region extractor 140 determines that the pixel is included in region C (S36). Region extractor 140 may store an extraction result indicating that the pixel is in region C, in storage 130. Specifically, third extractor 143 performs the process in Step S36.

After executing Loop 1 for all pixels, region extractor 140 ends Loop 1.

In the case where region extractor 140 determines that converter 170 performs conversion using the second EOTF (S31: No), region extractor 140 executes Loop 2 for each of the plurality of pixels constituting each of the plurality of pictures of the HDR video data.

When Loop 2 starts, region extractor 140 determines whether the code value of the pixel is less than knee point code C1 (S37).

In the case where the code value of the pixel is less than knee point code C1 (S37: Yes), region extractor 140 determines that the pixel is included in region A (S38). Region extractor 140 may store an extraction result indicating that the pixel is in region A, in storage 130. Specifically, first extractor 141 performs the process in Step S38.

In the case where the code value of the pixel is greater than or equal to knee point code C1 (S37: No), region extractor 140 determines whether the code value is less than delta point code C3 (S39).

In the case where the code value of the pixel is less than delta point code C3 (S39: Yes), region extractor 140 determines that the pixel is included in region B (S40). Region extractor 140 may store an extraction result indicating that the pixel is in region B, in storage 130. Specifically, second extractor 142 performs the process in Step S40.

In the case where the code value of the pixel is greater than or equal to delta point code C3 (S39: No), region extractor 140 determines whether the code value is less than delta point code C4 (S41).

In the case where the code value of the pixel is less than delta point code C4 (S41: Yes), region extractor 140 determines that the pixel is included in region C (S42). Region extractor 140 may store an extraction result indicating that the pixel is in region C, in storage 130. Specifically, third extractor 143 performs the process in Step S42.

In the case where the code value of the pixel is greater than or equal to delta point code C4 (S41: No), region extractor 140 determines that the pixel is included in region D (S43). Region extractor 140 may store an extraction result indicating that the pixel is in region D, in storage 130. Specifically, fourth extractor 144 performs the process in Step S43.

After executing Loop 2 for all pixels, region extractor 140 ends Loop 2.

After completing Loop 1 or Loop 2, region extractor 140 ends the extraction process.

The adjustment process of adjusting the sharpness gain will be described in detail below, with reference to FIG. 14.

Figure 14:
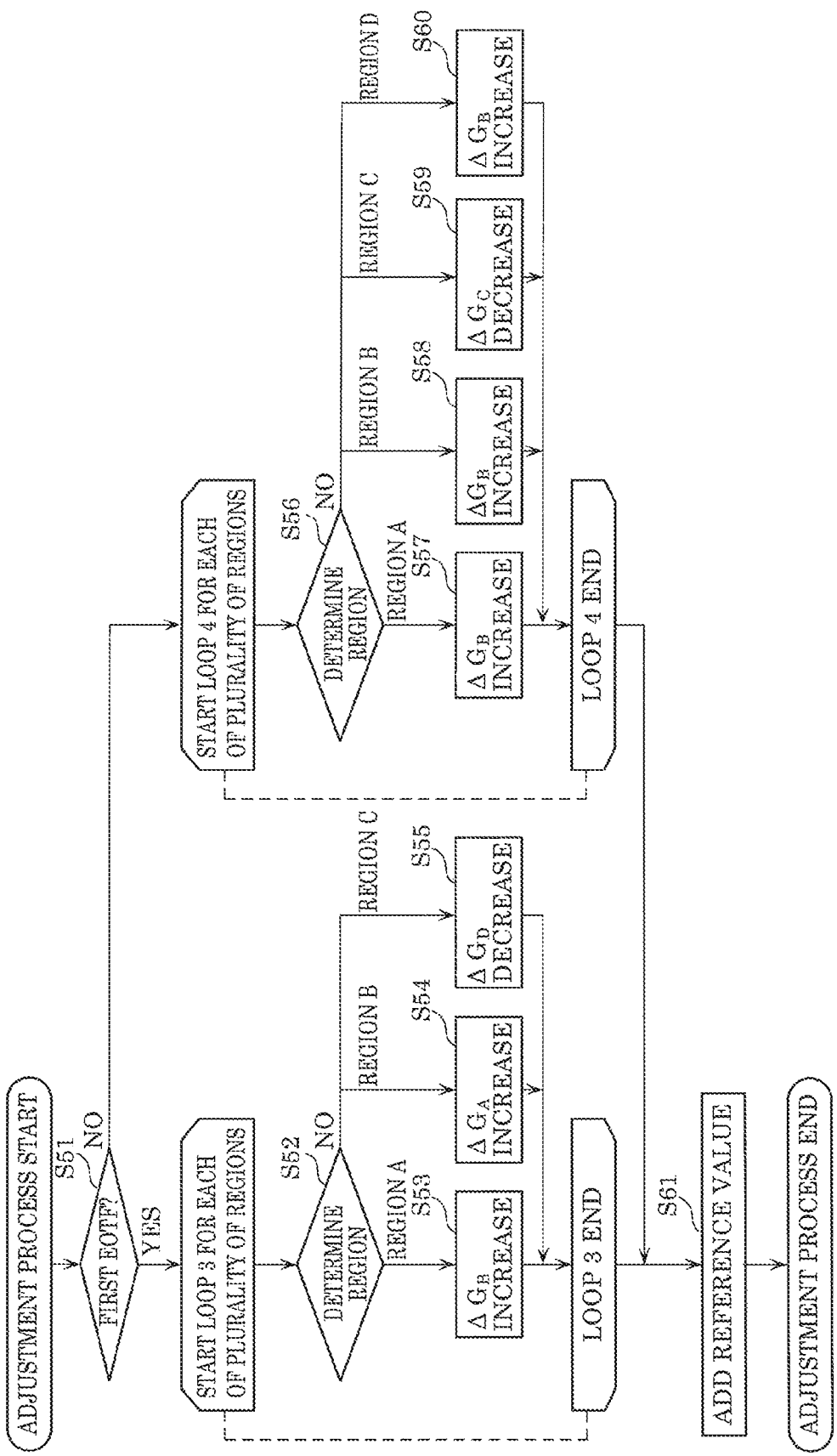
FIG. 14 is a flowchart illustrating an example of an adjustment process of adjusting a sharpness gain.

FIG. 14 is a flowchart illustrating an example of the adjustment process of adjusting the sharpness gain.

When the adjustment process starts, adjuster 150 in display apparatus 100 determines whether converter 170 performs conversion using the first EOTF (S51).

In the case where adjuster 150 determines that converter 170 performs conversion using the first EOTF (S51: Yes), adjuster 150 executes Loop 3 for each of the plurality of regions A to C extracted in the extraction process.

When Loop 3 starts, adjuster 150 determines which of regions A to C the region is (S52). If information indicating, for each region extracted by region extractor 140, whether the region corresponds to conversion using the first EOTF or conversion using the second EOTF is stored together with the extraction results, adjuster 150 may perform a determination process combining the processes in Steps S51 and S52.

In the case where adjuster 150 determines that the region is region A (S52: region A), adjuster 150 increases the sharpness gain in the region by difference value $\Delta G_B$ (S53). Specifically, first adjuster 151 and first setter 156 in adjuster 150 perform the process in Step S53. Data A is thus obtained.

In the case where adjuster 150 determines that the region is region B (S52: region B), adjuster 150 increases the sharpness gain in the region by difference value $\Delta G_A$ (S54). Specifically, second adjuster 152 and second setter 157 in adjuster 150 perform the process in Step S54. Data B is thus obtained.

In the case where adjuster 150 determines that the region is region C (S52: region C), adjuster 150 decreases the sharpness gain in the region by difference value $\Delta G_D$ (S55). Specifically, third adjuster 153 and third setter 158 in adjuster 150 perform the process in Step S55. Data C is thus obtained.

After executing Loop 3 for all regions, adjuster 150 ends Loop 3.

In the case where adjuster 150 determines that converter 170 performs conversion using the second EOTF (S51: No), adjuster 150 executes Loop 4 for each of the plurality of regions A to D extracted in the extraction process.

When Loop 4 starts, adjuster 150 determines which of regions A to D the region is (S56). If information indicating, for each region extracted by region extractor 140, whether the region corresponds to conversion using the first EOTF or conversion using the second EOTF is stored together with the extraction results, adjuster 150 may perform a determination process combining the processes in Steps S51 and S56.

In the case where adjuster 150 determines that the region is region A (S56: region A), adjuster 150 increases the sharpness gain in the region by difference value $\Delta G_B$ (S57). Specifically, first adjuster 151 and first setter 156 in adjuster 150 perform the process in Step S57. Data A is thus obtained.

In the case where adjuster 150 determines that the region is region B (S56: region B), adjuster 150 increases the sharpness gain in the region by difference value $\Delta G_B$ (S58). Specifically, second adjuster 152 and second setter 157 in adjuster 150 perform the process in Step S58. Data B is thus obtained.

In the case where adjuster 150 determines that the region is region C (S56: region C), adjuster 150 decreases the sharpness gain in the region by difference value $\Delta G_C$ (S59). Specifically, third adjuster 153 and third setter 158 in adjuster 150 perform the process in Step S59. Data C is thus obtained.

In the case where adjuster 150 determines that the region is region D (S56: region D), adjuster 150 increases the sharpness gain in the region by difference value $\Delta G_B$ (S60). Specifically, fourth adjuster 154 and fourth setter 159 in adjuster 150 perform the process in Step S60. Data D is thus obtained.

After executing Loop 4 for all regions, adjuster 150 ends Loop 4.

After completing Loop 3 or Loop 4, adjuster 150 adds the result of the process by fifth adjuster 155 and fifth setter 160 (i.e. data E) to the result of Loop 3 (i.e. data A to C) or the result of Loop 4 (i.e. data A to D), and outputs adjusted data obtained as a result of the addition (S61).

3. Advantageous Effects, Etc

Display apparatus 100 according to this embodiment includes obtainer 110, converter 170, region extractor 140, adjuster 150, and display 180. Obtainer 110 obtains HDR video data representing a luminance of each pixel by a code value. Converter 170 converts the HDR video data into HDR video using a first EOTF. Region extractor 140 determines, for each pixel of the HDR video data, whether the code value of the pixel is included in a first range of less than a first code value corresponding to a first point at which a slope of a tangent to the first EOTF changes from less than a predetermined slope to greater than or equal to the predetermined slope or a second range of greater than or equal to the first code value, to extract a first region including a pixel having a code value included in the first range and a second region including a pixel having a code value included in the second range. Adjuster 150 adjusts a sharpness gain of the HDR video data, by increasing a sharpness gain of the first region relative to a sharpness gain of the second region in the HDR video data. Display 180 displays the HDR video obtained as a result of conversion by converter 170, using adjusted data obtained as a result of adjustment by adjuster 150.

Thus, in display apparatus 100, in view of the possibility that the luminance data high frequency component of the master video data becomes deficient due to encoding or decoding process, the sharpness gain of the first region is increased relative to the sharpness gain of the second region, to uniformize the sharpness gain change rate between different pixels. This allows the sharpness effect of the first region as a low luminance region to be closer to the sharpness effect of the second region as a high luminance region. Hence, a decrease in sharpness of the HDR video obtained by converting the HDR video data can be prevented effectively.

4. Variations

In the foregoing embodiment, display apparatus 100 includes controller 120 as its functional structure. However, display apparatus 100 need not necessarily include controller 120. That is, the information calculated by controller 120 in the foregoing embodiment may be obtained from outside, or stored in storage 130 beforehand. For example, the knee point code may be included in the video data as metadata. The delta point codes may be stored in storage 130 beforehand. Adjuster 150 may directly use a predetermined correction value stored in storage 130 to set the correction value, instead of calculating the correction value using the sharpness gain curve and the sharpness gain. The second EOTF may be stored in storage 130 beforehand.

In the foregoing embodiment, in the case where converter 170 performs conversion using the second EOTF, region extractor 140 determines, for each of the plurality of pixels, whether the code value of the pixel is less than knee point code C1, and performs a process of extracting two regions in the range of less than delta point code C3. However, the regions to be separated are not limited to region A of less than knee point code C1 and region B of greater than or equal to the knee point. In such a case, adjuster 150 may perform a process of increasing the sharpness gain in a region extracted by region extractor 140 and including each pixel having a code value of less than delta point code C3, by difference value $\Delta G_B$.

In the foregoing embodiment, region extractor 140 and adjuster 150 determine whether the conversion by converter 170 is performed using the first EOTF or the second EOTF. However, the present disclosure is not limited to such. For example, in the case where the display apparatus uses the second EOTF for every conversion, the process in the case of performing conversion using the second EOTF may be performed every time.

In the foregoing embodiment, in the case where converter 170 performs conversion using the first EOTF, region extractor 140 separates regions at knee point code C1. However, regions may not be separated at knee point code C1. Thus, adjuster 150 need not necessarily make the sharpness gain different between before and after knee point code C1.

In the foregoing embodiment, display apparatus 100 includes tuner 101, and obtainer 110 is implemented by tuner 101. However, the present disclosure is not limited to such. Obtainer 110 may obtain the HDR video data by reading the HDR video data recorded in a recording medium (predetermined package medium) such as an optical disc. In this case, obtainer 110 may be implemented by an electric device such as an optical pickup for reading the optical disc. Alternatively, obtainer 110 may obtain the HDR video data from an external server via a network such as the Internet. In this case, obtainer 110 may be implemented by a communication IF for communicating with the external server.

The foregoing embodiment has been described to illustrate the disclosed technology, through the detailed description and the accompanying drawings.

The structural elements in the detailed description and the accompanying drawings may include not only the structural elements essential for the solution of the problem but also the structural elements not essential for the solution of the problem, to illustrate the disclosed technology. The inclusion of such optional structural elements in the detailed description and the accompanying drawings therefore does not mean that these optional structural elements are essential structural elements.

The foregoing embodiment is intended to be illustrative of the disclosed technology, and so various changes, replacements, additions, omissions, etc. can be made within the scope of the appended claims and their equivalents.

INDUSTRIAL APPLICABILITY

The present disclosure is useful as a display apparatus, a display method, etc. that can effectively adjust the sharpness gain of HDR video obtained by converting HDR video data.

The invention claimed is:

1. A display apparatus, comprising:
a decoder that obtains high dynamic range (HDR) video data representing a luminance of each pixel by a code value;
a control circuit; and
a display device, wherein
the control circuit:
converts the HDR video data into HDR video using a first electro-optical transfer function (EOTF);
determines, for each pixel of the HDR video data, whether the code value of the pixel is included in a first range of less than a first code value or a second range of greater than or equal to the first code value, to extract a first region including a pixel having a code value included in the first range and a second region including a pixel having a code value included in the second range, the first EOTF representing a conversion curve indicating a correspondence between a code value and a luminance, the conversion curve having a shape in which a slope of a tangent to the code value increases with an increase in the code value, the first code value being a code value corresponding to a first point at which a tangent having a predetermined slope is in contact with the conversion curve; and
generates adjusted data in which a sharpness gain of the first region is set to be higher than a sharpness gain of the second region in the HDR video data, the first region and second region sharpness gains being used to correct a contour of the HDR video; and
the display device applies the adjusted data to the HDR video and displays a resulting HDR video having the contour corrected, and
wherein the control circuit selectively performs conversion using the first EOTF and conversion using a second EOTF depending on a maximum luminance of the HDR video data, the second EOTF having a curve different from the first EOTF in a range in which a code value is greater than a knee point code and being used to convert HDR video data having a code value corresponding to a luminance that is greater than a maximum display luminance into HDR video having the maximum display luminance as a maximum luminance, the maximum display luminance indicating a maximum luminance displayable by the display device, and
in a case where the control circuit performs the conversion using the first EOTF:
the control circuit further extracts, in the first region, a third region including a pixel having a code value included in a third range of less than the knee point code and a fourth region including a pixel having a code value included in a fourth range of greater than or equal to the knee point code; and
the control circuit generates the adjusted data in which a sharpness gain of the third region is set to be higher than a reference value by a first value, and a sharpness gain of the fourth region is set to be higher than the reference value by a second value less than the first value, and the sharpness gain of the second region is set to be lower than the reference value by a third value, the reference value representing a value of a sharpness gain to be referred in the generating of the adjusted data.

2. The display apparatus according to claim 1, wherein the second EOTF has, as the knee point code, a code value of a pixel corresponding to an ordinal position of a number of a predetermined proportion of all of a plurality of pixels of the HDR video data when the plurality of pixels are arranged in ascending order of code value.

3. The display apparatus according to claim 1,
wherein in a case where the control circuit performs the conversion using the second EOTF:
the control circuit determines, for each pixel of the HDR video data, whether the code value of the pixel is included in a fifth range that is a code value range in which a slope of a tangent to the second EOTF is less than the predetermined slope or a sixth range that is a code value range in which the slope of the tangent to the second EOTF is greater than or equal to the predetermined slope, to extract a fifth region including a pixel having a code value included in the fifth range and a sixth region including a pixel having a code value included in the sixth range; and
the control circuit generates the adjusted data in which a sharpness gain of the fifth region is set to be higher than the reference value by a fourth value and a sharpness gain of the sixth region is set to be lower than the reference value by a fifth value.

4. The display apparatus according to claim 3,
wherein the second EOTF has two change points with an increase in code value, the two change points being a second point at which the slope of the tangent changes from less than the predetermined slope to greater than or equal to the predetermined slope and a third point at which the slope of the tangent changes from greater than or equal to the predetermined slope to less than the predetermined slope, and
the control circuit extracts, in the fifth region, a seventh region including a pixel having a code value included in a seventh range of less than a second code value corresponding to the second point and an eighth region including a pixel having a code value included in an eighth range of greater than or equal to a third code value corresponding to the third point, and extracts, as the sixth region, a region including a pixel included in the sixth range of greater than or equal to the second code value and less than the third code value.

5. The display apparatus according to claim 4,
wherein in the case where the control circuit performs the conversion using the second EOTF:
the control circuit further extracts, in the seventh region, a ninth region including a pixel having a code value included in a ninth range of less than the knee point code, and a tenth region including a pixel having a code value included in a tenth range of greater than or equal to the knee point code; and
the control circuit generates the adjusted data in which each of a sharpness gain of the ninth region and a sharpness gain of the tenth region is set to be higher than the reference value by the fourth value equal to the first value.

6. The display apparatus according to claim 5,
wherein the control circuit adjusts the sharpness gain of the fourth region in the case where the control circuit performs the conversion using the first EOTF, and adjusts a sharpness gain of the eighth region in the case where the control circuit performs the conversion using the second EOTF, and
the control circuit adjusts the sharpness gain of the second region in the case where the control circuit performs the conversion using the first EOTF, and adjusts the sharpness gain of the sixth region in the case where the control circuit performs the conversion using the second EOTF.

7. A display method, comprising:
obtaining high dynamic range (HDR) video data representing a luminance of each pixel by a code value;
converting the HDR video data into HDR video using a first electro-optical transfer function (EOTF);
determining, for each pixel of the HDR video data, whether the code value of the pixel is included in a first range of less than a first code value or a second range of greater than or equal to the first code value, to extract a first region including a pixel having a code value included in the first range and a second region including a pixel having a code value included in the second range, the first EOTF representing a conversion curve indicating a correspondence between a code value and a luminance, the conversion curve having a shape in which a slope of a tangent to the code value increases with an increase in the code value, the first code value being a code value corresponding to a first point at which a tangent having a predetermined slope is in contact with the conversion curve;
generating adjusted data in which a sharpness gain of the first region is set to be higher than a sharpness gain of the second region in the HDR video data, the first region and second region sharpness gains being used to correct a contour of the HDR video;
applying the adjusted data to the HDR video, and displaying a resulting HDR video having the contour corrected;
selectively performing conversion using the first EOTF and conversion using a second EOTF depending on a maximum luminance of the HDR video data, the second EOTF having a curve different from the first EOTF in a range in which a code value is greater than a knee point code and being used to convert HDR video data having a code value corresponding to a luminance that is greater than a maximum display luminance into HDR video having the maximum display luminance as a maximum luminance, the maximum display luminance indicating a maximum luminance displayable by a display device; and
in a case where conversion is performed using the first EOTF:
further extracting, in the first region, a third region including a pixel having a code value included in a third range of less than the knee point code and a fourth region including a pixel having a code value included in a fourth range of greater than or equal to the knee point code; and
generating the adjusted data in which a sharpness gain of the third region is set to be higher than a reference value by a first value, and a sharpness gain of the fourth region is set to be higher than the reference value by a second value less than the first value, and the sharpness gain of the second region is set to be lower than the reference value by a third value, the reference value representing a value of a sharpness gain to be referred in the generating of the adjusted data.

8. A display apparatus, comprising:
a decoder that obtains high dynamic range (HDR) video data representing a luminance of each pixel by a code value;
a control circuit; and
a display device, wherein
the control circuit:
converts the HDR video data into HDR video using a first electro-optical transfer function (EOTF);
determines, for each pixel of the HDR video data, whether the code value of the pixel is included in a first range of less than a first code value or a second range of greater than the first code value, to extract a first region including a pixel having a code value included in the first range and a second region including a pixel having a code value included in the second range, the first EOTF representing a conversion curve indicating a correspondence between a code value and a luminance, the conversion curve having a shape in which a slope of a tangent to the code value increases with an increase in the code value, the first code value being a code value corresponding to a first point at which a tangent having a predetermined slope is in contact with the conversion curve; and
the display device displays the HDR video obtained as a result of conversion by the control circuit, using adjusted data obtained as a result of adjustment by the control circuit, and
wherein the control circuit selectively performs conversion using the first EOTF and conversion using a second EOTF depending on a maximum luminance of the HDR video data, the second EOTF having a curve different from the first EOTF in a range in which a code value is greater than a knee point code and being used to convert HDR video data having a code value corresponding to a luminance that is greater than a maximum display luminance into HDR video having the maximum display luminance as a maximum luminance, the maximum display luminance indicating a maximum luminance displayable by the display device, and
in a case where the control circuit performs the conversion using the first EOTF:
the control circuit further extracts, in the first region, a third region including a pixel having a code value included in a third range of less than the knee point code and a fourth region including a pixel having a code value included in a fourth range of greater than or equal to the knee point code; and
the control circuit generates the adjusted data in which a sharpness gain of the third region is set to be higher than a reference value by a first value, and a sharpness gain of the fourth region is set to be higher than the reference value by a second value less than the first value, and the sharpness gain of the second region is set to be lower than the reference value by a third value, the reference value representing a value of a sharpness gain to be referred in the generating of the adjusted data.

9. A display method, comprising:
obtaining high dynamic range (HDR) video data representing a luminance of each pixel by a code value;
converting the HDR video data into HDR video using a first electro-optical transfer function (EOTF);
determining, for each pixel of the HDR video data, whether the code value of the pixel is included in a first range of less than a first code value or a second range of greater than the first code value, to extract a first region including a pixel having a code value included in the first range and a second region including a pixel having a code value included in the second range, the first EOTF representing a conversion curve indicating a correspondence between a code value and a luminance, the conversion curve having a shape in which a slope of a tangent to the code value increases with an increase in the code value, the first code value being a code value corresponding to a first point at which a tangent having a predetermined slope is in contact with the conversion curve;

generating adjusted data in which a sharpness gain of the first region is set to be higher than a sharpness gain of the second region in the HDR video data, the first region and second region sharpness gains being used to correct a contour of the HDR video;

applying the adjusted data to the HDR video, and displaying a resulting HDR video having the contour corrected;

selectively performing conversion using the first EOTF and conversion using a second EOTF depending on a maximum luminance of the HDR video data, the second EOTF having a curve different from the first EOTF in a range in which a code value is greater than a knee point code and being used to convert HDR video data having a code value corresponding to a luminance that is greater than a maximum display luminance into HDR video having the maximum display luminance as a maximum luminance, the maximum display luminance indicating a maximum luminance displayable by a display device, and in a case where conversion is performed using the first EOTF:

further extracting, in the first region, a third region including a pixel having a code value included in a third range of less than the knee point code and a fourth region including a pixel having a code value included in a fourth range of greater than or equal to the knee point code; and generating the adjusted data in which a sharpness gain of the third region is set to be higher than a reference value by a first value, and a sharpness gain of the fourth region is set to be higher than the reference value by a second value less than the first value, and the sharpness gain of the second region is set to be lower than the reference value by a third value, the reference value representing a value of a sharpness gain to be referred in the generating of the adjusted data.

* * * * *